United States Patent
Itami et al.

(10) Patent No.: US 7,023,108 B2
(45) Date of Patent: Apr. 4, 2006

(54) SEAT CONTROL DEVICE FOR VEHICLE

(75) Inventors: Yukihito Itami, Aki-gun (JP); Hirokazu Yamasaki, Aki-gun (JP); Tomonori Ohtsubo, Aki-gun (JP); Tomoo Taguchi, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 382 days.

(21) Appl. No.: 10/641,261

(22) Filed: Aug. 15, 2003

(65) Prior Publication Data

US 2004/0036330 A1    Feb. 26, 2004

(30) Foreign Application Priority Data

| Aug. 26, 2002 | (JP) | ............................. 2002-245122 |
| Aug. 26, 2002 | (JP) | ............................. 2002-245123 |
| Aug. 26, 2002 | (JP) | ............................. 2002-245577 |

(51) Int. Cl.
  *B60N 2/06* (2006.01)
  *B60N 2/07* (2006.01)
(52) U.S. Cl. .................. 307/10.1; 307/9.1; 297/257
(58) Field of Classification Search ............... 307/9.1, 307/10.1; 297/40, 38, 257
  See application file for complete search history.

(56) References Cited

U.S. PATENT DOCUMENTS

| 4,900,079 A | * | 2/1990 | Obara et al. .................. 296/64 |
| 6,074,009 A | * | 6/2000 | Farino .................... 297/378.14 |
| 6,820,911 B1 | * | 11/2004 | Furui ....................... 296/65.01 |

FOREIGN PATENT DOCUMENTS

| JP | 08-156658 | 6/1996 |
| JP | 2000-160933 | 6/2000 |

* cited by examiner

*Primary Examiner*—Lynn Feild
*Assistant Examiner*—Michael Rutland-Wallis
(74) *Attorney, Agent, or Firm*—Nixon Peabody LLP; Donald R. Studebaker

(57) ABSTRACT

When ingress intention of a passenger who is supposed to sit on a second seat is predicted, a distance between a first seat and the second seat is expanded automatically. Accordingly, taking time for access to the second seat can be avoided, thereby decreasing necessary time for having access and improving accessibility to the second seat. When a full-open mode is selected (Yes in S1); the passenger does not sit on the third-row seat (Yes in S2); the passenger does not sit on the second-row seat (Yes in S3); and a child seat is not installed on the second-row seat (Yes in S4), a second-row seat sliding motor is driven and a first-row seat driving mechanism operates. Accordingly, forward sliding of the second-row seat starts (S5), and a sliding door is driven backward to open fully.

20 Claims, 19 Drawing Sheets

SEAT CONTROL DEVICE FOR VEHICLE

BACKGROUND OF THE INVENTION

The present invention relates to a seat control device for a vehicle, particularly to a seat control device in which a distance between a first seat and a second seat expands automatically when ingress intention of a passenger who is supposed to sit on the second seat exists.

Conventionally, many types of auto vehicles equipped with two rows of seats disposed in a longitudinal direction of the vehicle are known, in which a first-row ingress and egress opening is disposed at a side of a first-row seat and a second-row ingress and egress opening is disposed at a side of a second-row seat. Generally, in van-type and wagon-type of auto vehicles equipped with three rows of seats disposed in the longitudinal direction of the vehicle, the first-row ingress and egress opening and the second-row ingress and egress opening are provided, but a third-row ingress and egress opening is not provided at a side of a third-row seat. Accordingly, passengers who are supposed to sit on the third-row seat get on and off through the second-row ingress and egress opening.

In these auto vehicles, when the passenger has access to the third-row seat, reclining the second-row seat forward or sliding the second-row seat forward to expand the distance between the second-row seat and the third-row seat can provide a state in which the passenger can have access to the third-row seat easily. Herein, technology in which seats are moved back and forth electrically (see, for example, Japanese Patent Laid-Open Publication No. 8-156658) is known. Further, there exists a vehicle in which a sliding door sliding back and forth is applied to the door to open or close the second-row ingress and egress opening. Herein, technology in which the sliding door is moved back and forth electrically (see, for example, Japanese Patent Laid-Open Publication No. 2000-160933) is known.

Herein, in auto vehicles equipped with three rows of seats disposed in the longitudinal direction of the vehicle, such as van-type and wagon-type vehicles, if the second-row seat is located at a place where it is used normally, it is difficult to have access to the third-row seat through the second-row opening because of an existence of the second-row seat. Therefore, when the passenger has access to the third-row seat through the second-row ingress and egress opening, it is necessary that the passenger or somebody reclines the seat back of the second-row seat forward or slides the second-row seat forward to expand the distance between the second-row seat and the third-row seat. Namely, having access to the third-row seat takes a long time, thereby deteriorating accessibility to the third-row seat and excellent operation.

Electric driving of a longitudinal movement of the second-row seat can decrease effort to move the second-row seat back and forth. However, because this should be done by operating switches additionally, it also needs time for having access to the third-row seat. Accordingly, this also has limited accessibility to the third-row seat and limited operation. Further, even if electric driving of the sliding door back and forth could be applied, some additional operations to expand the distance between the second-row seat and the third-row seat would be necessary in order to make access to the third-row seat easy. Accordingly, it would not easy to resolve the above problem.

SUMMARY OF THE INVENTION

The present invention has been devised in view of the above-described problems, and an object of the present invention is to provide a seat control device having excellent operation, in which ingress intention of a passenger who is supposed to sit on a second seat (for example, the third-row seat) that is behind a first seat (for example, the second-row seat) is predicted, and when it is predicted that there exists the ingress intention, the distance between the first seat and the second seat is expanded automatically, so that taking time for having access to the second seat can be avoided, thereby decreasing necessary time for having access and improving accessibility to the second seat.

In order to achieve the above-described object, the first aspect of the present invention provides a seat control device for a vehicle including a first seat and a second seat that are disposed in a longitudinal direction of the vehicle, and a seat driving mechanism that drives at least one of the first and second seats such that the one moves in the longitudinal direction of the vehicle, comprising second-seat ingress prediction section for predicting ingress intention of a passenger who is supposed to sit on the second seat, and seat driving control section that controls the seat driving mechanism such that a distance between the first seat and the second seat expands when the second-seat ingress prediction section predicts the ingress intention of the passenger who is supposed to sit on the second seat.

According to the seat control device for a vehicle of the first aspect of the invention, ingress intention of the passenger who is supposed to sit on the second seat is predicted by the second-seat ingress prediction section. Then, when the ingress intention of the passenger who is supposed to sit on the second seat is predicted, the seat driving control section controls the seat driving mechanism, and at least one of the first and second seats is driven in the longitudinal direction by the seat driving mechanism and the distance between the first seat and the second seat is expanded.

As described above, when the ingress intention of the passenger who is supposed to sit on the second seat exists, the distance between the first seat and the second seat is automatically expanded to provide a state in which the passenger can have access to the second seat easily. Accordingly, taking time for having access to the second seat can be avoided, thereby decreasing necessary time for having access and improving accessibility to the second seat, so that significantly easy operation is attained. Herein, in case of van-type and wagon-type of auto vehicles equipped with three rows of seats disposed in the longitudinal direction of the vehicle, the second-row seat may be the first seat and the third-row seat may be the second seat. Meanwhile, the first-row seat including a driver's seat may be the first seat and the second-row seat may be the second seat.

The second aspect of the present invention provides the seat control device for a vehicle of the first aspect of the invention, wherein the vehicle includes a sliding door that slides in the longitudinal direction of the vehicle so as to open or close an ingress and egress opening located substantially at a side of the first seat, the second-seat ingress prediction section comprises door opening detecting section for detecting an opening degree of the sliding door, and the seat driving control section comprises first-seat driving control section that moves the first seat forward when the door opening detecting section detects an opening degree of the sliding door that is greater than a certain opening degree.

According to the seat control device for a vehicle of the second aspect of the invention, the opening degree of the sliding door is detected by the above door opening detecting section. Then, when the opening degree of the sliding door that is greater than the above certain opening degree is detected, the seat driving mechanism is controlled by the first-seat driving control section, judging that there exists the ingress intention of the passenger who is supposed to sit on the second seat. Then, the first seat is moved forward by the seat driving mechanism, and the distance between the first seat and the second seat is expanded.

The third aspect of the present invention provides the seat control device for a vehicle of the first aspect of the invention, wherein the vehicle includes a sliding door that slides in the longitudinal direction of the vehicle so as to open or close an ingress and egress opening located substantially at a side of the first seat and a door driving mechanism that drives the sliding door in the longitudinal direction of the vehicle, the second-seat ingress prediction section comprises opening instruction section that instructs at least either a small opening mode to open the sliding door at a first opening degree or a large opening mode to open the sliding door at a second opening degree that is greater than the first opening degree, and the seat driving control section comprises first-seat driving control section that moves the first seat forward when the opening instruction section instructs the large opening mode.

According to the seat control device for a vehicle of the third aspect of the invention, when the opening instruction section instructs the small opening mode, the sliding door is driven by the door driving mechanism to open at the first opening degree. When the opening instruction section instructs the large opening mode, the sliding door is driven by the door driving mechanism to open at the second opening degree that is greater than the first opening degree. Further, the first seat is moved forward by the seat driving mechanism that is controlled by the first-seat driving control section, and the distance between the first seat and the second seat is expanded.

The fourth aspect of the present invention provides the seat control device for a vehicle of third aspect of the invention, wherein the opening degree of the sliding door is configured such that the passenger can have access to the first seat through the ingress and egress opening when the sliding door opens at the first opening degree, while the passenger can also have access to the second seat through the ingress and egress opening when the sliding door opens at the second opening degree.

According to the seat control device for a vehicle of the fourth aspect of the invention, when the sliding door opens at the first opening degree, the passenger can have access to the first seat through the ingress and egress opening located substantially at the side of the first seat. When the sliding door opens at the second opening degree, the distance between the first seat and the second seat is expanded to enable the passenger to have access to the second seat. Accordingly, the sliding door opens at the first opening degree so as to enable the passenger to have access to the first seat through the ingress and egress opening. Thus, the sliding door does not open unnecessarily wider, thereby reducing a load for its opening. Meanwhile, the sliding door opens at the second opening degree so as to also enable the passenger to have access to the second seat through the ingress and egress opening. Thus, the passenger can have access to the second seat through the ingress and egress opening easily.

The fifth aspect of the present invention provides the seat control device for a vehicle of the first aspect of the invention, wherein the second-seat ingress prediction section comprises ingress position detecting section for detecting an ingress position of the passenger at an ingress and egress opening located substantially at a side of the first seat, and the seat driving control section comprises first-seat driving control section that moves the first seat forward when the ingress position detecting section detects that the ingress position of the passenger is located at a side of the second seat.

According to the seat control device for a vehicle of the fifth aspect of the invention, the ingress position of the passenger at the ingress and egress opening located substantially at the side of the first seat is detected by the ingress position detecting section. Herein, when it is detected that the ingress position of the passenger is located at the side of the second seat, the first seat is moved forward by the seat driving mechanism that is controlled by the first-seat driving control section, and the distance between the first seat and the second seat is expanded.

The sixth aspect of the present invention provides the seat control device for a vehicle of the fifth aspect of the invention, wherein the ingress position detecting section comprises a step position detecting switch that is located at a step portion below the ingress and egress opening and to detect a step position of the passenger.

According to the seat control device for a vehicle of the sixth aspect of the invention, the step position of the passenger who steps on the step portion located below is detected by the step position detecting switch, and the ingress intention of the passenger to the second seat is predicted based on this step position detecting switch.

The seventh aspect of the present invention provides the seat control device for a vehicle of the first aspect of the invention, wherein the seat driving control section prohibits the driving of the seat driving mechanism under a certain condition.

According to the seat control device for a vehicle of the seventh aspect of the invention, the driving of the seat driving mechanism is prohibited and the distance between the first seat and the second seat is not expanded, under the certain condition. Accordingly, when there exist the ingress intention of the passenger to the second seat, under a condition except the certain condition, the distance between the first seat and the second seat is expanded automatically so as to provide a state in which the passenger can have access to the second seat easily. Meanwhile, under the certain condition, the distance between the first seat and the second seat is not expanded so as to provide a safe operation.

The eighth aspect of the present invention provides the seat control device for a vehicle of the seventh aspect of the invention, wherein the above certain condition is that the passenger sits on the first seat.

According to the seat control device for a vehicle of the eighth aspect of the invention, when the passenger sits on the first seat, the distance between the first seat and the second seat is not expanded even if there exists ingress intention of the passenger to the second seat.

The ninth aspect of the present invention provides the seat control device for a vehicle of the seventh aspect of the invention, wherein the above certain condition is that the passenger sits on the second seat.

According to the seat control device for a vehicle of the ninth aspect of the invention, when the passenger sits on the second seat, the distance between the first seat and the second seat is not expanded even if there exists ingress intention of the passenger to the second seat.

The tenth aspect of the present invention provides the seat control device for a vehicle of the seventh aspect of the invention, wherein the above certain condition is that a child seat is installed on the first seat.

According to the seat control device for a vehicle of the tenth aspect of the invention, when the child seat is installed on the first seat, the distance between the first seat and the second seat is not expanded even if there exists ingress intention of the passenger to the second seat.

The eleventh aspect of the present invention provides the seat control device for a vehicle of the first aspect of the invention, further comprising a sliding door that slides in the longitudinal direction of the vehicle so as to open or close an ingress and egress opening at a side of the vehicle, a door driving mechanism that drives the sliding door in the longitudinal direction of the vehicle, egress prediction section for predicting egress intention of a passenger sitting on the second seat, sliding door driving control section that controls the door driving mechanism such that the passenger sitting on the second seat can get off through the ingress and egress opening with the sliding door opened when the egress prediction section predicts the egress intention of the passenger.

According to the seat control device for a vehicle of the eleventh aspect of the invention, in addition to the above-described function and effect of the first aspect of the invention, the egress intention of the passenger sitting on the second seat is predicted by the egress prediction section. Herein, when the egress intention of the passenger sitting on the second seat is predicted, the sliding door is driven to open by the door driving mechanism that is controlled by the sliding door driving control section so as to enable the passenger sitting on the second seat to get off through the ingress and egress opening.

As described above, when the egress intention of the passenger sitting on the second seat is predicted, the sliding door is opened automatically and thereby the passenger sitting on the second seat can get off through the ingress and egress opening easily. Accordingly, taking time for egress of the passenger sitting on the second seat is avoided so as to shorten time for the egress, thereby significantly easing in operation.

The twelfth aspect of the present invention provides the seat control device for a vehicle of the eleventh aspect of the invention, wherein the ingress and egress opening is located substantially at a side of the first seat.

According to the seat control device for a vehicle of the twelfth aspect of the invention, in addition to the above-described function and effect of the first aspect of the invention, when there exists the egress intention of the passenger sitting on the second seat, the sliding door opens so that the passenger sitting on the second seat can get off through the ingress and egress opening located substantially at the side of the first seat.

The thirteenth aspect of the present invention provides the seat control device for a vehicle of the twelfth aspect of the invention, wherein the egress prediction section comprises walk-out detecting section for detecting a walk-out state of the first seat in which the passenger sitting on the second seat can get off through the ingress and egress opening, and the sliding door driving control section starts driving of the door driving mechanism when the walk-out detecting section detects the walk-out state of the first seat.

According to the seat control device for a vehicle of the thirteenth aspect of the invention, in addition to the above-described function and effect of the first aspect of the invention, when the first seat is in the walk-out state in which the passenger sitting on the second seat can get off through the ingress and egress opening, this walk-out state is detected by the walk-out detecting section. Then, the door driving mechanism is driven by the sliding door driving control section to open the sliding door.

The fourteenth aspect of the present invention provides the seat control device for a vehicle of the thirteenth aspect of the invention, wherein the walk-out detecting section includes seat sliding detecting section for detecting the first seat sliding forward by a certain amount or more.

According to the seat control device for a vehicle of the fourteenth aspect of the invention, in addition to the above-described function and effect of the first aspect of the invention, when the first seat is slid forward by the above certain amount or more, this first seat sliding forward by the above certain amount or more is detected by the seat sliding detecting section. As a result, the door driving mechanism is driven by the sliding door driving control section.

The fifteenth aspect of the present invention provides the seat control device for a vehicle of thirteenth aspect of the invention, wherein the walk-out detecting section includes reclining detecting section for detecting a seat back of the first seat reclining forward by a certain amount or more.

According to the seat control device for a vehicle of the fifteenth aspect of the invention, in addition to the above-described function and effect of the first aspect of the invention, when the seat back of the first seat is reclined forward by the above certain amount or more, this first seat's seat back reclining forward by the above certain amount or more is detected by the reclining detecting section. As a result, the door driving mechanism is driven by the sliding door driving control section.

The sixteenth aspect of the present invention provides the seat control device for a vehicle of the eleventh aspect of the invention, wherein the door driving mechanism is configured such that opening degree of the sliding door is selectable between a full-open mode where the sliding door is opened at the greatest opening degree and a partial-open mode where the sliding door is opened at an opening degree smaller than the greatest opening degree, and the sliding door driving control section selects the full-open mode when the egress prediction section predicts the egress intention of the passenger.

According to the seat control device for a vehicle of the sixteenth aspect of the invention, in addition to the above-described function and effect of the first aspect of the invention, the sliding door is driven by the door driving mechanism at the full-open mode where the sliding door is opened at the greatest opening degree, while the sliding door is driven by the door driving mechanism at the partial-open mode where the sliding door is opened at the opening degree which is smaller than the greatest opening degree. When it is detected by the egress prediction section that there exists the egress intention of the passenger sitting on the second seat, the sliding door driving control section brings the door driving mechanism into the full-open mode even if it is at the partial-open mode so as to open the sliding door at the greatest opening degree. Herein, switching operation section for switching mode to the full-open mode or the partial-open mode may be provided and the egress intention of the passenger sitting on the second seat may be predicted when the switching operation section switches mode to the full-open mode.

The seventeenth aspect of the present invention provides the seat control device for a vehicle of the sixteenth aspect of the invention, wherein the opening degree of the sliding door at the partial-open mode allows the passenger sitting on the first seat to get off through the ingress and egress opening, while the opening degree of the sliding door at the full-open mode allows the passenger sitting on the second seat to also get off through the ingress and egress opening.

According to the seat control device for a vehicle of the seventeenth aspect of the invention, in addition to the above-described function and effect of the first aspect of the invention, the opening degree of the sliding door at the partial-open mode by the door driving mechanism enables the passenger sitting on the first seat to get off through the ingress and egress opening, while the opening degree of the sliding door at the full-open mode by the door driving mechanism enables also the passenger sitting on the second seat to get off through the ingress and egress opening.

The eighteenth aspect of the present invention provides the seat control device for a vehicle of the eleventh aspect of the invention, including driving state detecting section for detecting a driving state of the vehicle, wherein the sliding door driving control section prohibits driving of the door driving mechanism when the driving state detecting section detects the driving state of the vehicle.

According to the seat control device for a vehicle of the eighteenth aspect of the invention, in addition to the above-described function and effect of the first aspect of the invention, when the driving sate of the vehicle is detected by the driving state detecting section, driving of the sliding door driving mechanism is prohibited even if egress intention of the passenger sitting on the second seat is predicted. As a result, the sliding door does not open.

The nineteenth aspect of the present invention provides a seat control device for a vehicle comprising, a first-row seat including a driver's seat, a second-row seat disposed behind the first-row seat, a third-row seat disposed behind the second-row seat, a sliding door that slides in a longitudinal direction of the vehicle so as to open or close an ingress and egress opening located substantially at a side of the second-row seat, a seat driving mechanism that drives the second-row seat in the longitudinal direction of the vehicle, a door driving mechanism that drives the sliding door in the longitudinal direction of the vehicle, wherein the sliding door is configured so as to be opened at a certain first opening degree and a second opening degree that is greater than the first opening degree by the door driving mechanism, and a control unit that controls the seat driving mechanism and the door driving mechanism, wherein the control unit includes third-row seat ingress prediction section for predicting ingress intention of a passenger who is supposed to sit on the third-row seat, and seat driving control section that controls the seat driving mechanism such that a distance between the second-row seat and the third-row seat expands when the third-row seat ingress prediction section predicts the ingress intention of the passenger who is supposed to sit on the third-row seat, wherein the third-row seat ingress prediction section includes remote control operation section that instructs at least either a small opening mode to open the sliding door at the first opening degree or a large opening mode to open the sliding door at the second opening degree, and the seat driving control section drives the seat driving mechanism to move the second-row seat forward when the remote control operation section instructs the large opening mode.

According to the seat control device for a vehicle of the nineteenth aspect of the invention, in the vehicle including three rows of seats, the same functions and effects as the first and third aspects of the invention, which are described above, are obtained. Particularly, the third-row seat ingress prediction section comprises the remote control operation section that at least selectively control the sliding door at the first opening degree or the second opening degree by remote control operation. Accordingly, the prediction and the opening or closing the sliding door can be done easily.

The twentieth aspect of the present invention provides the seat control device for a vehicle of the nineteenth aspect of the invention, wherein the control unit further includes egress prediction section for predicting egress intention of a passenger sitting on the third-row seat, the sliding door is opened by the door driving mechanism such that the passenger sitting on the third-row seat can get off through the ingress and egress opening when the egress prediction section predicts the egress intention of the passenger, and the egress prediction section includes seat sliding detecting section for detecting the second-row seat sliding forward by a certain amount or more.

According to the seat control device for a vehicle of the twentieth aspect of the invention, the same functions and effects as the eleventh and fourteenth aspects of the invention, which are described above, are obtained.

BRIEF DESCRIPTION OF THE DRAWINGS

Other features, aspects, and advantages of the present invention will become apparent from the following description of the invention which refers to the accompanying drawings.

FIG. 20A is a horizontal sectional view of a right-half part of the auto vehicle and FIG. 20B is a vertical sectional view of the auto vehicle.

FIG. 23A is a horizontal sectional view of a right-half part of the auto vehicle and FIG. 23B is a vertical sectional view of the auto vehicle.

FIG. 25A is a horizontal sectional view of a right-half part of the auto vehicle and FIG. 25B is a vertical sectional view of the auto vehicle.

DETAILED DESCRIPTION OF THE INVENTION

Hereinafter, preferred embodiments of the present invention will be described with reference to the accompanying drawings. The present embodiment shows an example in which a seat control device of the present invention is applied to a wagon-type auto vehicle equipped with three rows of seats disposed in the longitudinal direction of the vehicle.

Figure 1:
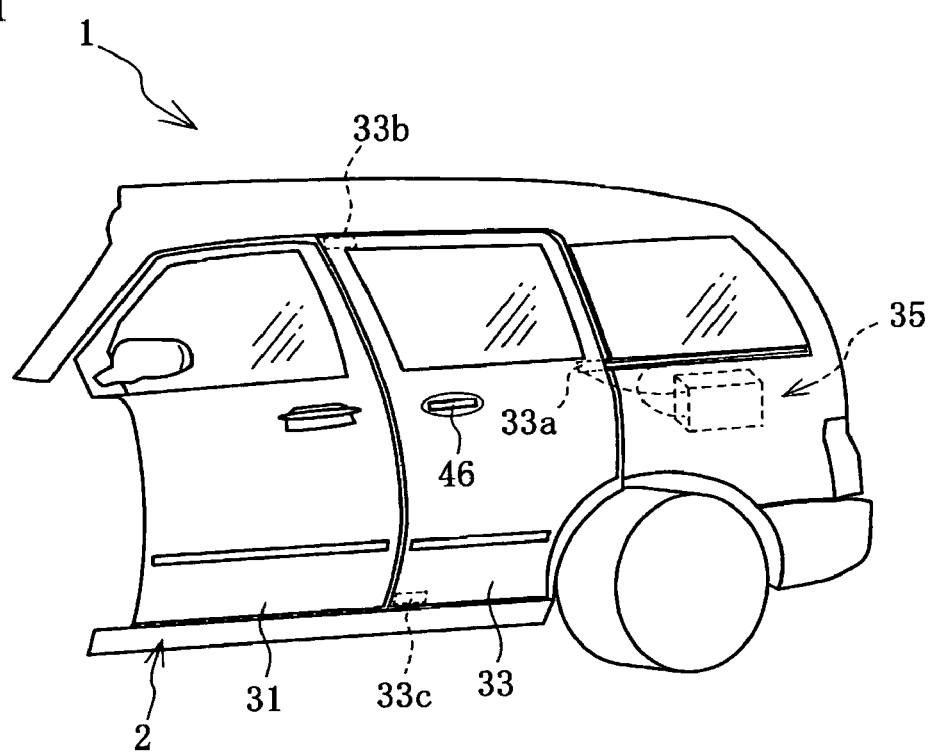
FIG. 1 is a perspective view of part of an auto vehicle according to a preferred embodiment of the present invention.
Figure 2:
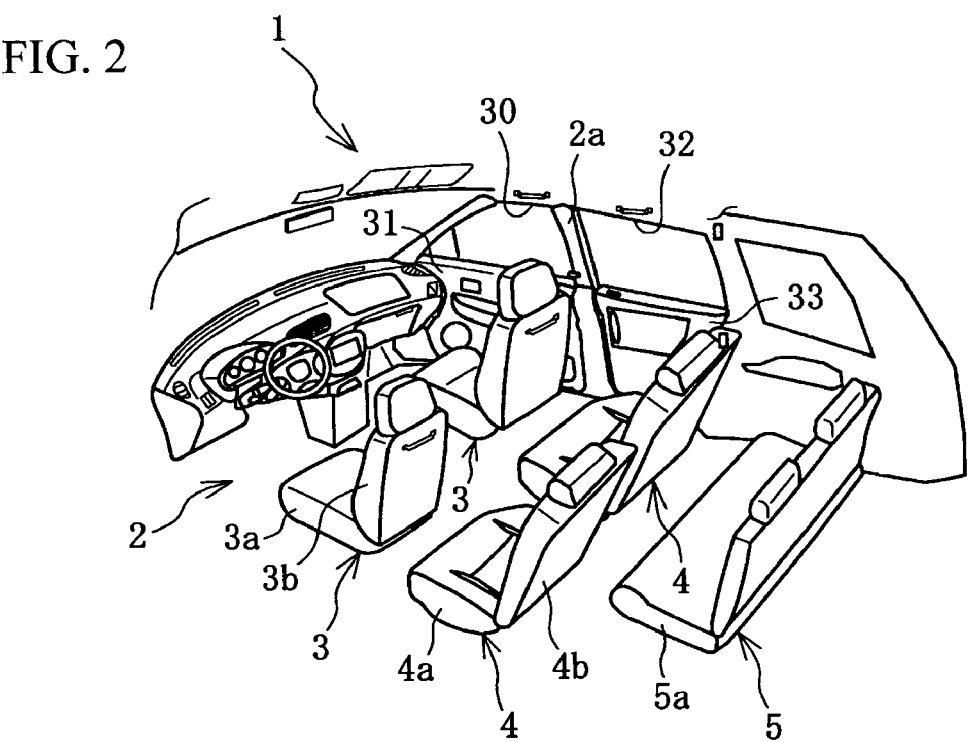
FIG. 2 is a perspective view of an inside of the auto vehicle, which is seen from vehicle's rear and upper side.
Figure 3A:
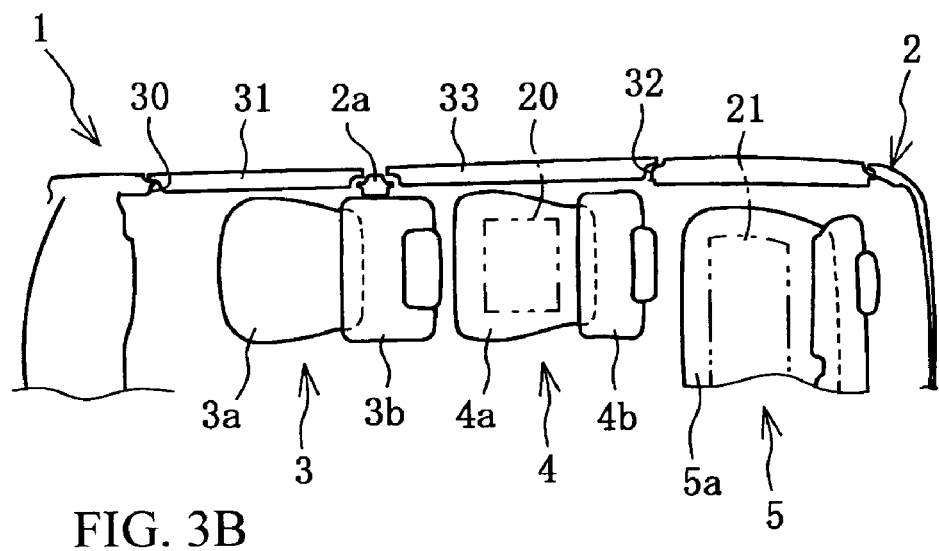
FIG. 3A is a horizontal sectional view of a right-half part of the auto vehicle.
Figure 3B:
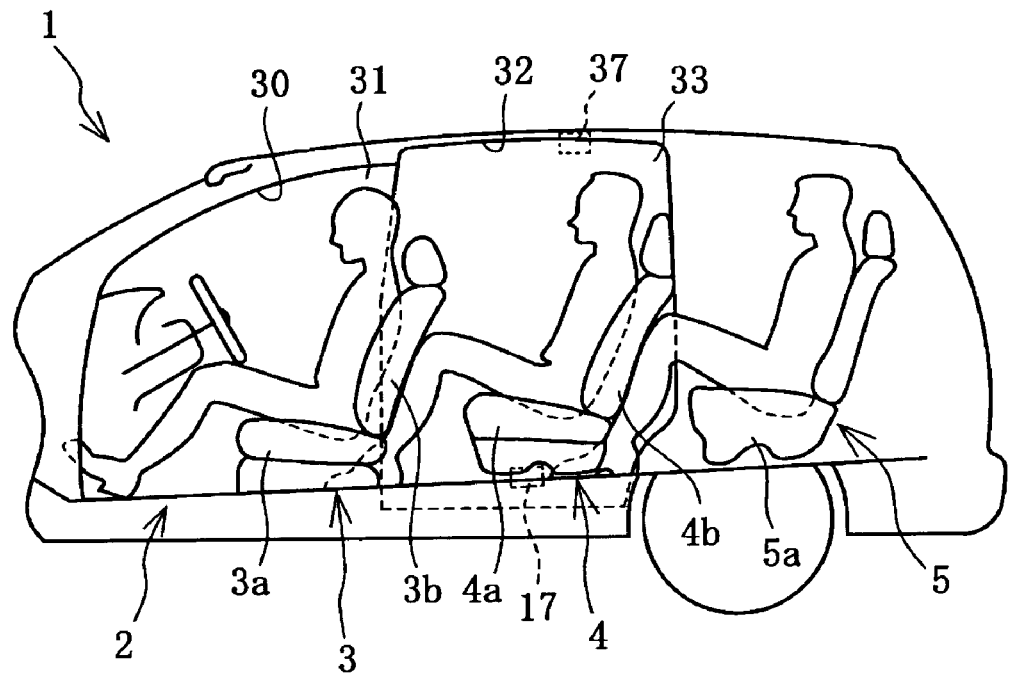
FIG. 3B is a vertical sectional view of the auto vehicle.

As shown in FIGS. 1–3, a vehicle body 2 of an auto vehicle 1 is equipped with a pair of left and right first-row seats 3 including a driver's seat, a pair of left and right second-row seats 4 that are disposed behind the first-row seats 3, and a third-row seat 5 comprises a bench seat that is disposed behind the second-row seat 4. Herein, the second-row seats 4 and the third-row seat 5 that are disposed back and forth correspond to a first seat and a second seat, respectively.

The first-row seats 3 and the second-row seat 4 are respectively supported and guided on a floor of the vehicle body 2 so as to slide in the longitudinal direction of the vehicle. Each of the first-row seats 3 is driven by a first-row seat driving mechanism 10 (see FIG. 12) having a first-row seat sliding motor 11 so as to move in the longitudinal direction, while each of the second-row seats 4 is driven by a second-row seat driving mechanism 12 (see FIG. 12) having a second-row seat sliding motor 13 so as to move in the longitudinal direction.

A first-row seat operating switch 14 (see FIG. 12) is provided at a side portion of each of the first-row seats 3, while a second-row seat operating switch 15 (see FIG. 12) is provided at a side portion of each of the second-row seats 4. Operations of the first-row seat driving mechanism 10 and the second-row seat driving mechanism 12, respectively corresponding to the seat operating switches 14 and 15 that are operated by a passenger and the like, drive the first-row seats 3 and the second-row seats 4 in the longitudinal direction so that they can be placed at any position in a certain range.

Herein, a second-row seat sliding detecting switch 17 for detecting each of the second-row seats 4 sliding forward by a certain amount or more is provided. Further, passenger sitting sensors 20, 21 are provided at obverse sides of seat cushions 4a, 5a of the second-row seats 4 and the third-row seat 5, so that the presence of passengers on the second-row seats 4 and the third-row seat 5 can be detected.

Figure 4:
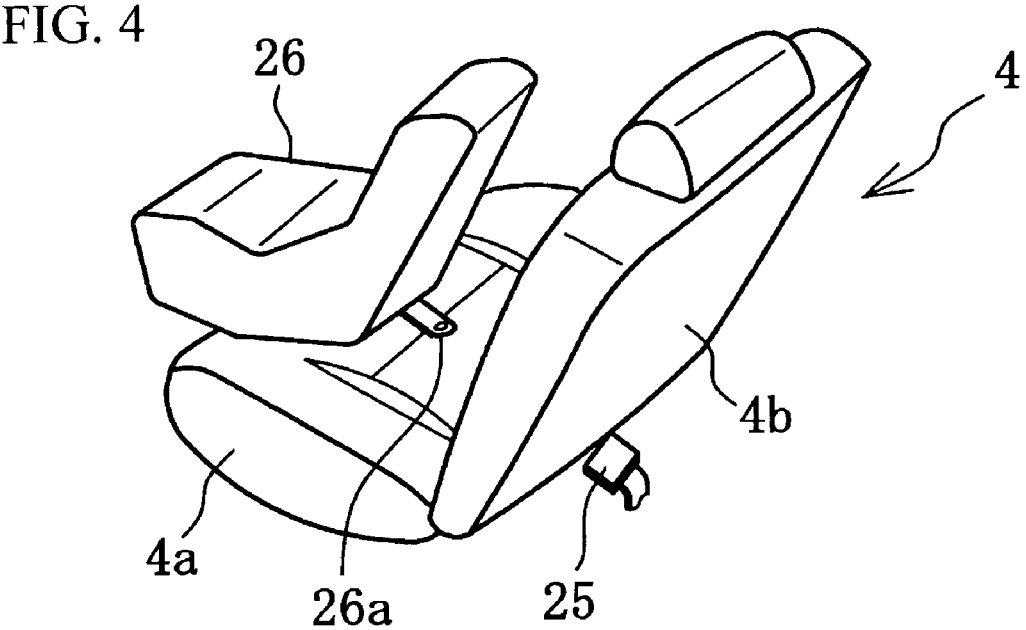
FIG. 4 is a perspective view of a second-row seat and a child seat, which are seen from vehicle's rear and upper side.
Figure 5:
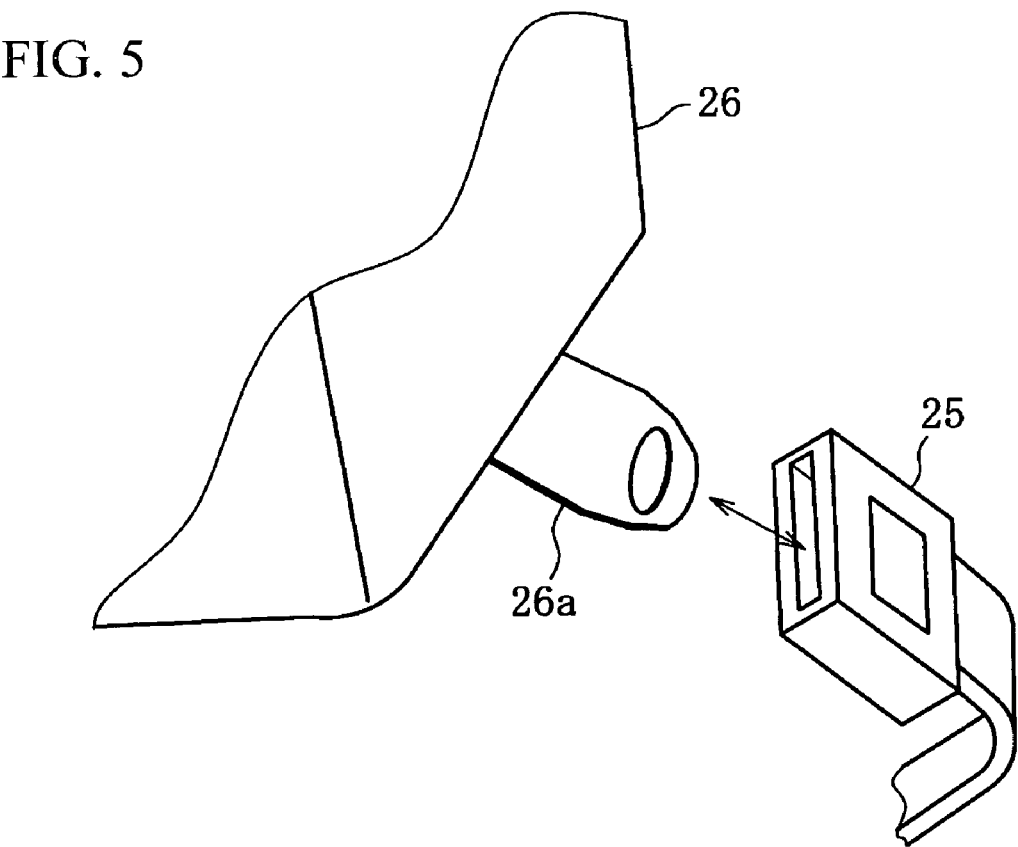
FIG. 5 is a perspective view of an essential part of the child seat and a buckle.

As shown in FIGS. 4 and 5, the second-row seat 4 is provided with a buckle 25 that is fixed to the back side of the seat cushion 4a, and a child seat 26 is installed on the second-row seat 4 by placing the child seat 26 on the seat cushion 4a and then inserting a tongue plate 26a extending rearward from the child seat 26, which passes through between the seat cushion 4a and the seat back 4b, into the buckle 25. The buckle 25 is provided with a child seat installment switch 27 (see FIG. 12) so that installing of the child seat 26 on the second-row seat 4 can be detected.

As shown in FIGS. 1–3, first-row ingress and egress openings 30 are formed at the vehicle body 2, which are located substantially at the both sides of the first-row seat 3, and a pair of front doors 31 is provided to open or close the first-row ingress and egress openings 30. Each front door 31 comprises a hinge door that is connected to a main part of the vehicle body 2 at its front end portion so as to rotate freely about a vertical axis.

Also, second-row ingress and egress openings 32 are formed at the vehicle body 2 which are located substantially at the both sides of the second-row seat 4, through which ingress and egress of the passenger to or from the second-row seat 4 or the second-row seat 5 is done. A pair of sliding doors 33 that slides in the longitudinal direction of the vehicle is provided to open or close the second-row ingress and egress openings 32.

Rollers 33a–33c are attached to the insides of the sliding doors 33, by which the sliding doors 33 are guided and supported to the main part of the vehicle body 2 so as to slide freely. The sliding doors 33 are respectively driven back and forth by door driving mechanisms 35 including sliding door operation motors 36 (see FIG. 12), which are disposed at the rear sides of the second-row ingress and egress openings 32.

Figure 9:
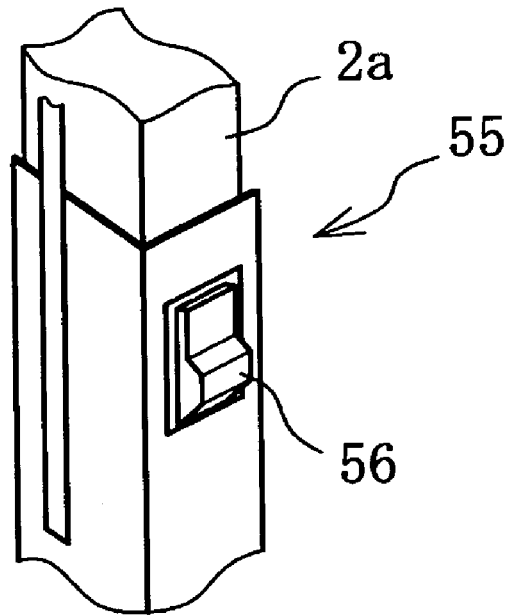
FIG. 9 is a perspective view of still another opening instruction operating portion.
Figure 10A:
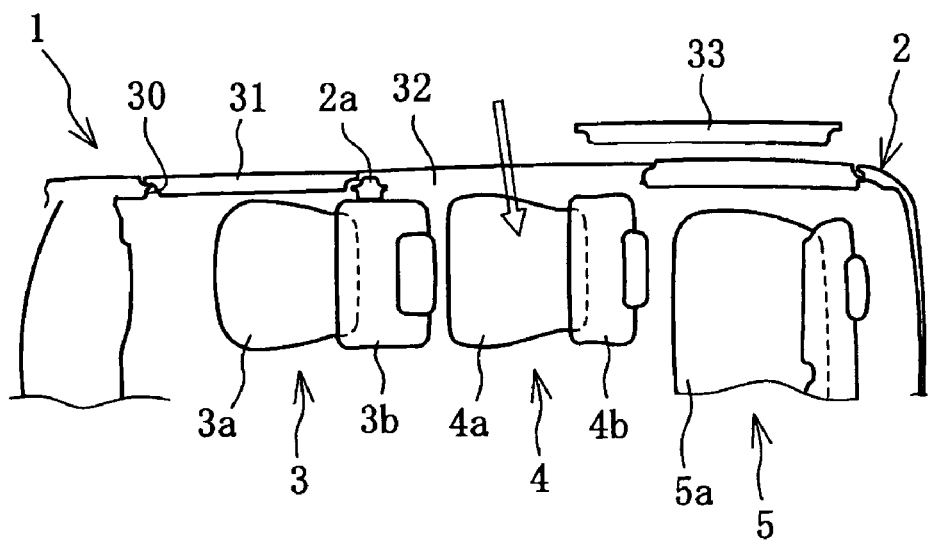
FIG. 10A is a horizontal sectional view of a right-half part of the auto vehicle and FIG. 10B is a vertical sectional view of the auto vehicle, after a partial-open mode is instructed.
Figure 10B:
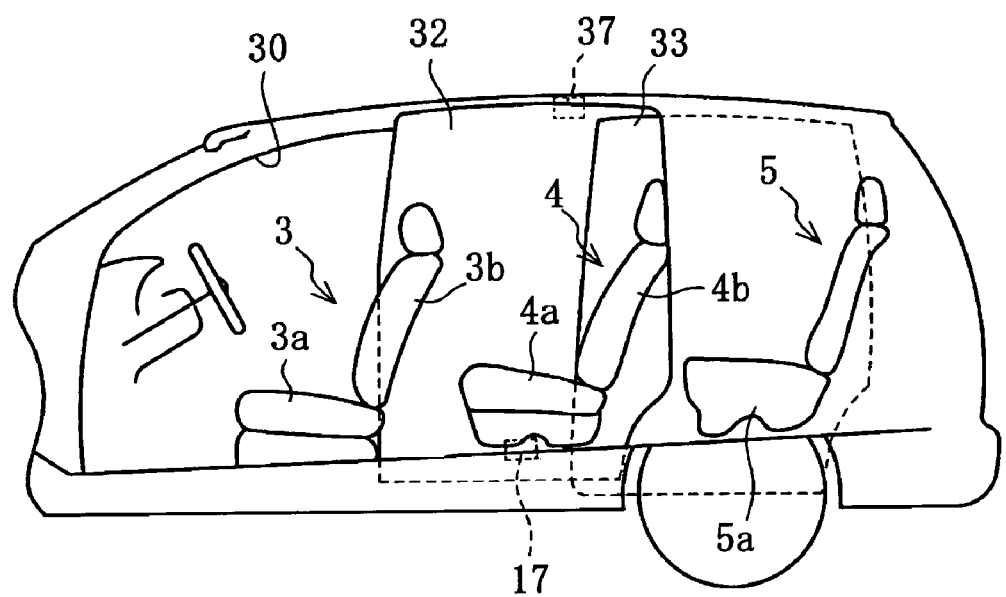
Figure 11A:
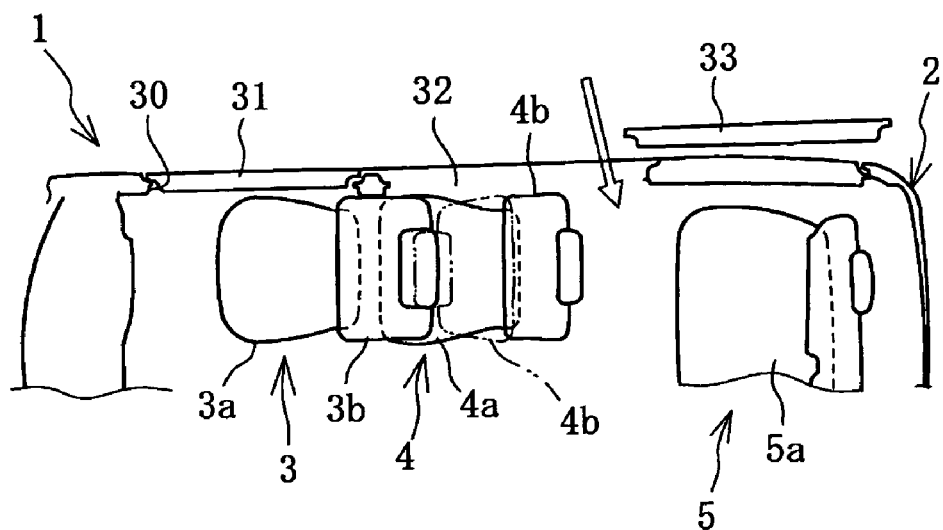
FIG. 11A is a horizontal sectional view of a right-half part of the auto vehicle and FIG. 11B is a vertical sectional view of the auto vehicle, after a full-open mode is instructed.
Figure 11B:
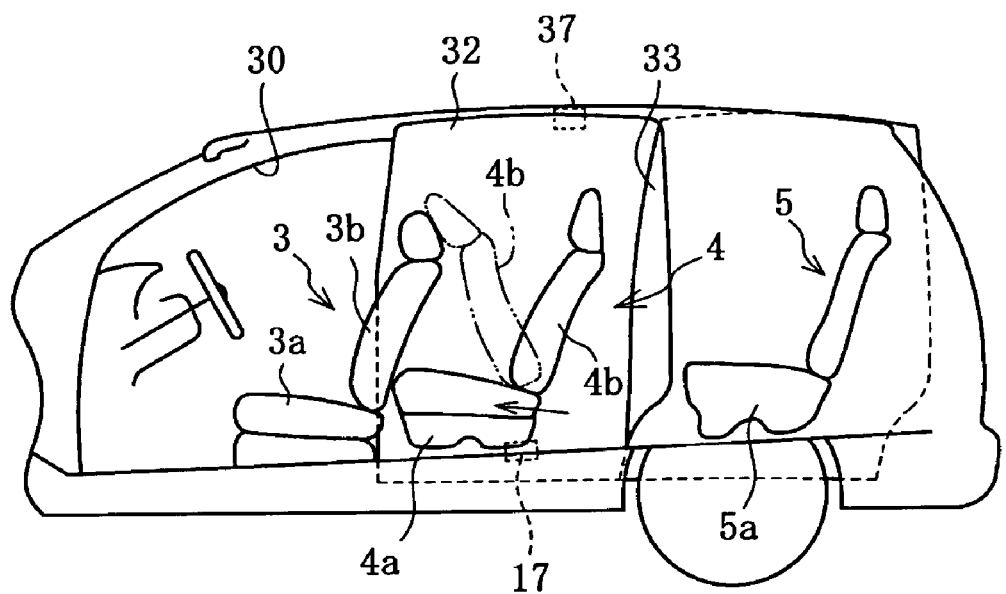

Opening operation by the door driving mechanism 35 enables the sliding door 33 to open at a first opening degree shown in FIG. 10 or at a second opening degree shown in FIG. 11, which is greater than the first opening degree. And, opening instruction operating portions 40, 45, 50, 55 (see FIGS. 6–9) are provided as opening instruction operating means that instructs either a small opening mode to open the sliding door 33 at the first opening degree (partial open) or a large opening mode to open the sliding door 33 at the second opening degree (full open).

Figure 6:
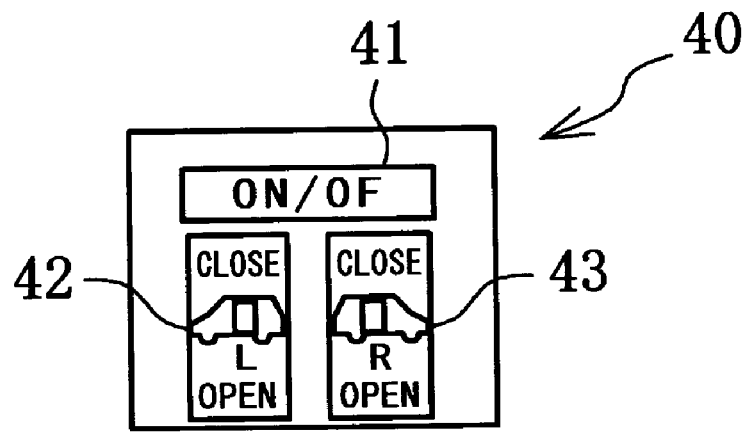
FIG. 6 is an elevational view of an opening instruction operating portion.

As shown in FIG. 6, the opening instruction operating portion 40 is provided at an instrument panel and includes a main switch 41, an L-door operation switch 42 and an R-door operation switch 43. When the main switch 41 is turned ON, operating of the L-door operation switch 42 and the R-door operation switch 43 comes into effect. Then, under the condition that the left-side or right-side sliding door 33 is closed fully, one pushing operation of an OPEN side of the L-door operation switch 42 or the R-door operation switch 43 enables the left-side or right-side sliding door 33 to open partially. Meanwhile, two continuous pushing operation of that enables the left-side or right-side sliding door 33 to open fully. Under the condition that the left-side or right-side sliding door 33 is opened partially or fully, pushing of a CLOSE side of the L-door operation switch 42 or the R-door operation switch 43 enables the left-side or right-side sliding door 33 to close fully.

Figure 7:
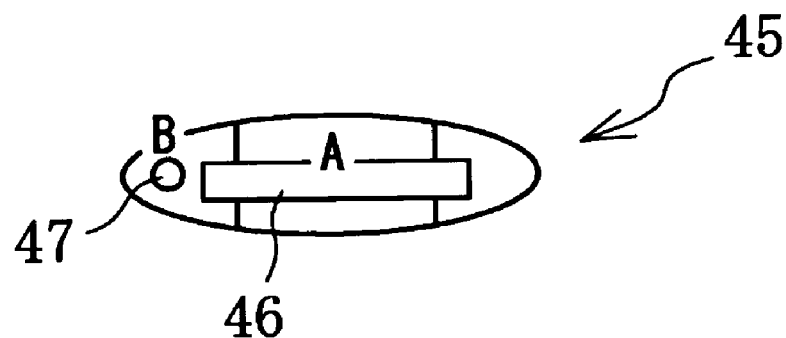
FIG. 7 is a side view of another opening instruction operating portion.

As shown in FIG. 7, the opening instruction operating portion 45 is provided at each sliding door 33, and includes a door handle 46 for the sliding door 33 and a door switch 47 that can be operated concurrently with the door handle 46. Under the condition that the left-side or right-side sliding door 33 is closed, only operating of the door handle 46 enables the corresponding left-side or right-side sliding door 33 to open partially, while operating of the door handle 46 with pushing the door switch 47 enables the corresponding left-side or right-side sliding door 33 to open fully.

Figure 8:
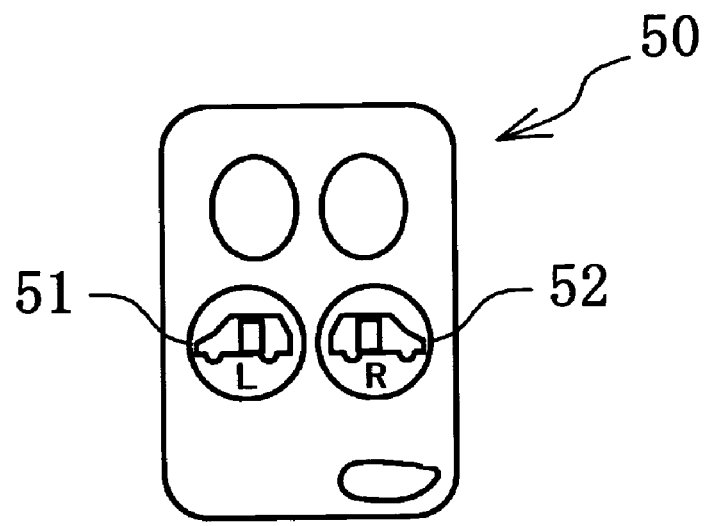
FIG. 8 is a side view of yet another opening instruction operating portion.

As shown in FIG. 8, the opening instruction portion 50 comprises a remote control operating portion, and includes an L switch 51 and an R switch 52. Under the condition that the left-side or right-side sliding door 33 is closed fully, one pushing operation of the L switch 51 or the R switch 52 enables the left-side or right-side sliding door 33 to open partially. Meanwhile, two continuous pushing operation of that enables the left-side or right-side sliding door 33 to open fully. Under the condition that the left-side or right-side sliding door 33 is opened half or fully, pushing operation of the L switch 51 or the R switch 52 enables the left-side or right-side sliding door 33 to close fully.

As shown in FIG. 9, the opening instruction operating portion 55 is provided at each center pillar 2a, and includes one switch 56. Under the condition that the left-side or right-side sliding door 33 is closed fully, one pushing operation of the switch 56 enables the corresponding left-side or right-side sliding door 33 to open partially. Meanwhile, two continuous pushing operation of that enables the corresponding left-side or right-side sliding door 33 to open fully. Under the condition that the left-side or right-side sliding door 33 is opened partially or fully, pushing operation of the switch 56 enables the corresponding left-side or right-side sliding door 33 to close fully.

Herein, the first-row ingress and egress openings 30 and the second-row ingress and egress openings 32 are separated by the center pillar 2a. The position of the first-row seat 3 and the second-row seat 4 (third-row seat 5) in the longitudinal direction shown in FIG. 3 is the standard position suitable for daily use, in which the center pillar 2a is located substantially at the side of a seat back 3b of the first-row seat 3, and a rear-end portion of the second-row ingress and egress opening 32 is located substantially at the side of a seat back 4b of the second-row seat 4, so that access of the passenger through the second-row ingress and egress opening 32 to the third-row seat 5 is unable.

FIG. 11 shows a state in which the second-row seat 4 is located at a certain front position, the distance between the first seat 3 and the second seat 4 expands more than that shown in FIG. 3, and in this state reclining the seat back 4a forward as shown in a dash-dotted line enables the passenger to easily have access to the third-row seat 5 through the second-row opening 32. Herein, the opening instruction operating portions 40, 45, 50, 55 correspond to second-seat ingress prediction means that predicts ingress intention of the passenger who is supposed to sit on the third-row seat 5.

When the opening instruction operating portions 40, 45, 50, 55 are operated to instruct the full-open mode, it is predicted that there exists ingress intention of the passenger who is supposed to sit on the third-row seat 5. Herein, if the sliding door 33 that is instructed is closed, it is opened fully automatically. And, the second-row seat 4 at the side of the instructed sliding seat 33 or both of the left and right second-row seats 4 moves to its front position automatically when its position is located at the rear side of the above-described certain front position, thereby expanding the distance between the second-row seat 4 and the third-row seat 5.

Herein, even if the full-open mode is instructed, the second-row seat 4 does not move forward automatically under a certain condition, so that the distance between the second-row seat 4 and the third-row seat 5 does not expand. This certain condition is at least one of that the passenger sits on the second-row seat 4, the passenger sits on the third-row seat 5, and the child seat 26 is installed on the second-row seat 4.

Figure 12:
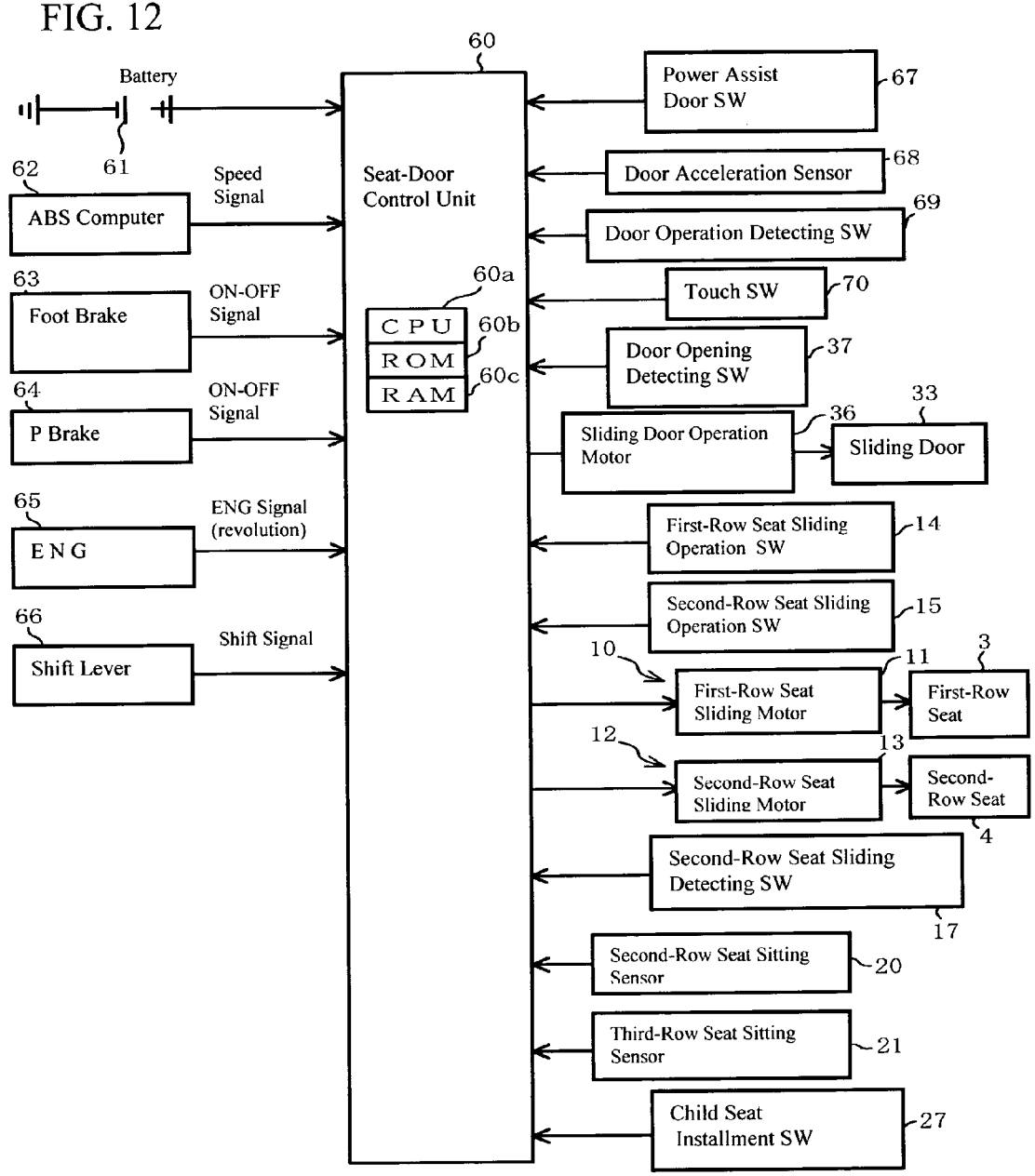
FIG. 12 is a block diagram of a control system relating to a seat control unit.

Next, a control system relating to a seat-door control unit 60 shown in FIG. 12 will be described. Herein, for components provided in pairs at the both sides (for example, sliding door operation motors 36 and the like), only one of the pair is illustrated. The seat-door control unit 60 includes a computer having a CPU 60a, a ROM 60b and a RAM 60c. A battery 61 is connected to the seat-door control unit 60, and respective signals illustrated are inputted to the seat-door control unit 60 from an ABS computer 62, a foot brake 63, a parking brake 64, an engine 65 and a shift lever 66.

Further, a power assist door switch 67, the first-row seat sliding operating switch 14, and the second-row seat operating switch 15 as operating switches operated by the passenger and the like, and a door acceleration sensor 68, a door operation detecting switch 69, a touch switch 70, a door opening detecting switch 37, the second-row seat sliding detecting switch 17, the second-row seat sitting sensor 20, the third-row seat sitting sensor 21 and a child seat installment switch 27, as sensors, are electrically connected to the seat-door control unit 60, respectively. Herein, the power assist door 67 includes a plurality of switches provided at the opening instruction operating portions 40, 45, 50, 55 shown in FIGS. 6–9.

The sliding door operation motor 36, the first-row seat sliding motor 11, the second-row seat sliding motor 13 are electrically connected to the seat-door control unit 60, and the sliding door operation motor 36, the first-row seat sliding motor 11, the second-row seat sliding motor 13 are driven and controlled by the seat-door control unit 60 based on the signals from the above switches and sensors. Herein, the seat-door control unit 60 includes driver circuits operative to drive the motors 36, 11, 13 respectively.

Herein, a seat control device for a vehicle of the present invention comprises the second-row seat 4, the third-row seat 5, the second-row seat driving mechanism 12, the power assist door switch 67, the seat-door control unit 60 and the like. The seat-door control unit 60 corresponds to seat driving control means, and when it is predicted that there exists ingress intention of the passenger who is supposed to sit on the third-row seat 5, the second-row seat driving mechanism 12 is controlled by the seat-door control unit 60 such that the distance between the second-row seat 4 and the third-row seat 5 expands.

Next, a particular control of the present invention that the seat-door control unit 60 executes will be described with reference to the flow chart of FIG. 13. Herein, Si (i=1, 2, 3 - - - ) in the flow chart denotes respective steps. A control program to execute this control is stored in the ROM 60a.

Figure 13:
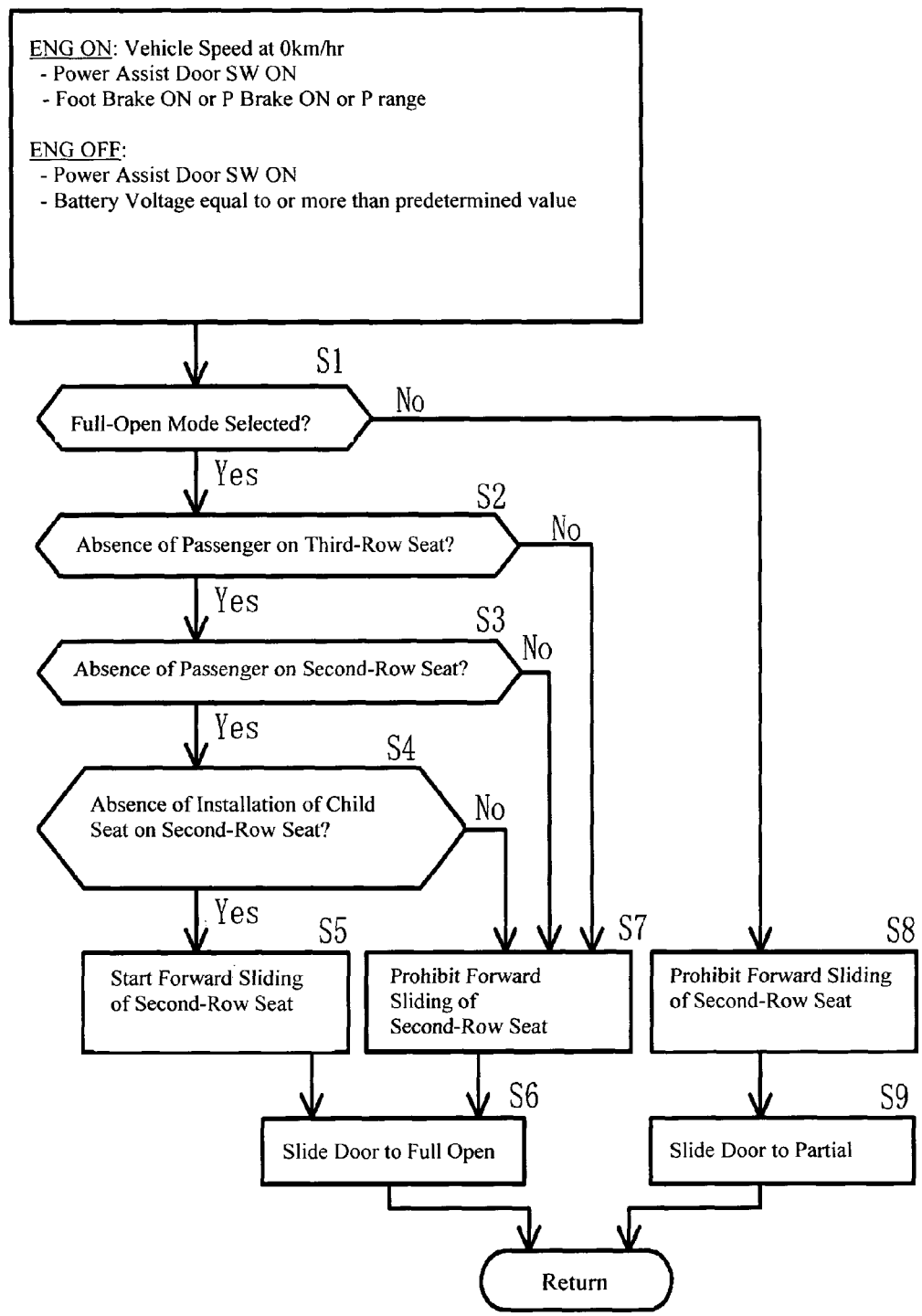
FIG. 13 is a flow chart for seat control.

As shown in FIG. 13, while the engine is ON, the control starts when the vehicle speed is at 0 km/h; the power assist door switch is ON; and the foot brake is ON or the parking brake is ON or the sift position is at parking. On the other hand, while the engine is OFF, the control starts when the power assist door switch is ON and a voltage of the battery 61 is equal to or more than a predetermined value. Herein, in the description of the control, the following movements of the second-row seat 4, the sliding door 33 and the like are movements of the sliding door 33 that is caused by the instruction from the power assist door switch and the second-row seat corresponding to this and the like.

When the control starts, firstly it is determined based on the signal from the power assist door switch 67 whether the full-open mode is selected or not (S1). When the full-open mode is selected (Yes in S1), it is determined based on the signal from the third-row seat sitting sensor 21 whether the passenger sits on the thirst-row seat 5 or not (S2).

When the passenger does not sit on the third-row seat 5 (Yes in S2), it is determined based on the signal from the second-row seat sitting sensor 20 whether the passenger sits on the second-row seat 4 or not (S3). When the passenger does not sit on the second-row seat 4 (Yes in S3), it is determined based on the signal from the child seat installment switch 27 whether the child seat 26 is installed on the second-row seat 4 or not (S4).

Then, when the child seat 26 is not installed on the second-row seat 4 (Yes in S4), the second-row seat driving mechanism 12 operates by driving second-row seat sliding motor 13, and forward sliding of the second-row seat 4 starts, so that the sliding door 33 is driven to the above-described certain front position. Meanwhile, the door driving mechanism 35 operates by driving the sliding door operation motor 36 and the sliding door 33 is driven backward to open fully (S6), and then the sequence returns. As a result, the state shown in FIG. 11 is provided.

Meanwhile, even if the full-open mode is selected (Yes in S1), the second-row seat sliding motor 13 is not driven when the passenger does not sit on the third-row seat 5 (No in S2), the passenger sits on the second-row seat 4 (No in S3), or the child seat 26 is installed on the second-row seat 4 (No in S4). As a result, forward sliding of the second-row seat 4 is prohibited (S7) and only the sliding door 33 is driven backward to open fully (S6), and then the sequence returns.

Further, when the partial-open mode is selected (No in S1), forward sliding of the second-row seat 4 is prohibited (S8) and the door driving mechanism 35 operates by driving the sliding door operation motor 36, and the sliding door 33 is driven backward to open partially (S9), and then the sequence returns. As a result, the state shown in FIG. 10 is provided. Herein, the seat-door control unit 60 and the steps S1, S5 executed by the control unit 60 correspond to first-seat driving control means that moves the second-row seat 4 forward when the full-open mode is instructed.

As described above, in the seat control device, when the passenger intends to have access to the third-row seat 5, the distance between the second-row seat 4 and the third-row seat 5 expands automatically. Accordingly, a state is provided in which the passenger can easily have access to the third-row seat 5 through the second-row ingress and egress opening 32 located substantially at the side of the second-row seat 4, and taking time for having access to the third-row seat 5 can be avoided, thereby decreasing necessary time for having access and improving accessibility to the third-row seat 5, so that significantly easy operation is attained.

When the small opening mode is instructed by operating the opening instruction operating portions 40, 45, 50, 55, the sliding door 33 is moved automatically to open to the certain first opening degree. Meanwhile, when the large opening mode is instructed, the ingress intention of the passenger who is supposed to have access to the third-row seat 5 can be predicted easily, and herein the sliding door 33 is moved backward to open to the second opening degree that is greater than the first opening degree. Further, the second-row seat 4 is moved forward so as to expand the distance between the second-row seat 4 and the third-row seat 5.

The sliding door 33 opens partially at the first opening degree so as to enable the passenger to have access to the second-row seat 4 through the second-row ingress and egress opening 32. Thus, the sliding door 33 does not open unnecessarily wider, thereby reducing a load for its opening motion. Meanwhile, the sliding door 33 opens fully at the second opening degree so as to also enable the passenger to have access to the third-row seat 5 through the second-row ingress and egress opening 32. Thus, the passenger can easily have access to the third-row seat 5 through the second-row ingress and egress opening 32.

Even if the full-open mode is instructed by the ingress intention of the passenger to the third-row seat 5, the distance between the second-row seat 4 and the third-row seat 5 does not expand when the passenger sits on the second-row seat 4; the passenger sits on the third-row seat 5; or the child seat 26 is installed on the second-row seat 4. Accordingly, the passenger does not feel unpleasant sensation and the installation of the child seat 26 is maintained, thereby providing a safe operation as well.

Next, some alternative embodiments that are partially changed from the above-described embodiments will be described.

Alternative Embodiment 1

Figure 14:
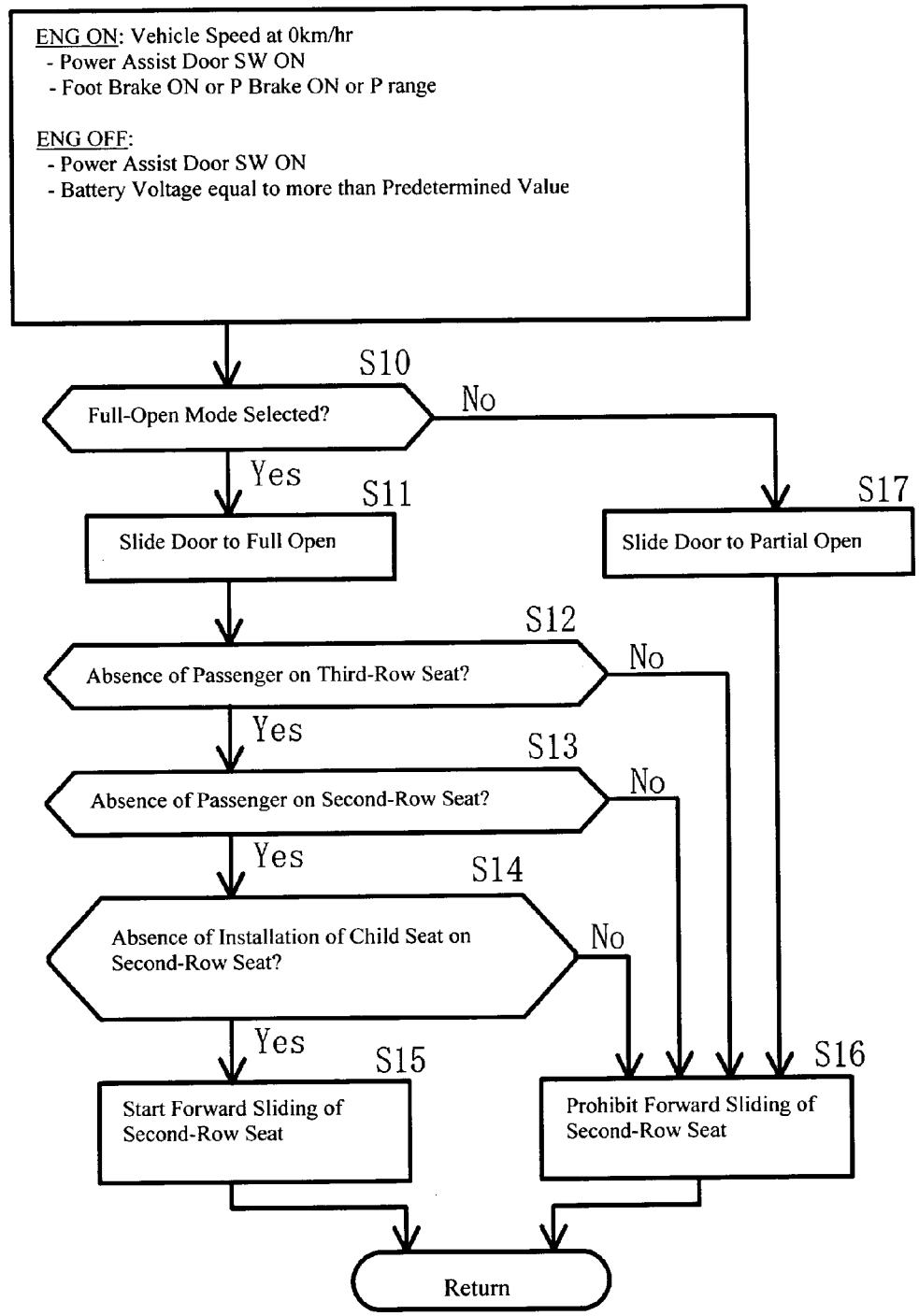
FIG. 14 is a flow chart for seat control according to an alternative embodiment 1.

Instead of the flow char of FIG. 13, the flow chart of FIG. 14 (Si (i=10, 11, 12 - - - ) denotes each step) is applicable. As shown in FIG. 14, starting condition of the control is the same as that in the flow chart of FIG. 13, and when the control starts and the full-open mode is selected (Yes in S10), firstly the sliding door 33 is driven backward to open fully (S11). Next, when the passenger does not sit on the third-row seat 5 (Yes in S12); the passenger does not sit on the second-row seat 4 (Yes in S13); and the child seat 26 is not installed on the second-row seat 4 (Yes in S14), the second-row seat 4 starts sliding forward (S15).

Even if the full-open mode is selected (Yes in S10), sliding forward of the second-row seat 4 is prohibited (S16) when the passenger sits on the third-row seat 5 (No in S12); the passenger sits on the second-row seat 4 (No in S13); and the child seat 26 is installed on the second-row seat 4 (No in S14). Further, when the partial-open mode is selected (No in S10), firstly the sliding door 33 is driven backward to open partially (S17) and sliding forward of the second-row seat 4 is prohibited (S16).

Alternative Embodiment 2

Figure 15:
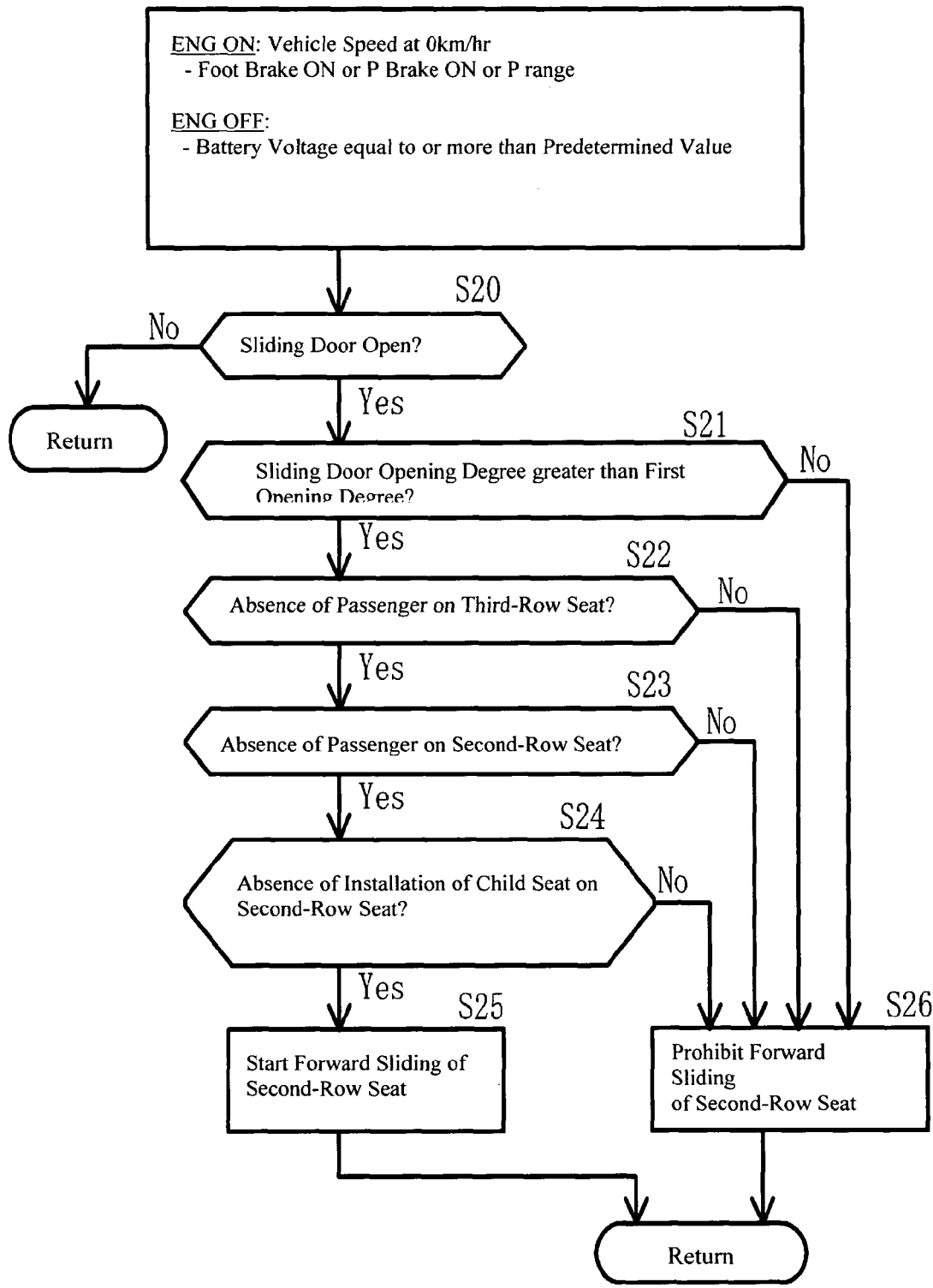
FIG. 15 is a flow chart for seat control according to an alternative embodiment 2.

The sliding door 33 may be operated manually, omitting the door driving mechanism 35, and also the opening instruction operations 40, 45, 50, 55 may be omitted. In this case, the door opening detecting switch 37 for detecting the opening of the sliding door 33 is applied as the second-seat ingress prediction means. This control is executed by the flow chart (Si (i=20, 21, 22 - - - ) denotes each step) of FIG. 15. While the engine is ON, this control starts when the vehicle speed is at 0 km/h; the foot brake is ON or the parking brake is ON or the sift position is at parking range. On the other hand, while the engine is OFF, this control starts when a voltage of the battery 61 is equal to or more than a predetermined value. When the control starts and the sliding door 33 is opened (Yes in S20), it is determined based on the signal from the door opening detecting switch 37 whether the opening degree of the sliding door 33 is greater than the certain first opening degree or not (S21).

When the opening degree of the sliding door 33 is greater than the certain first opening degree (Yes in S21), steps S22–S26 that are the same as steps S2–S5 and S7 of FIG. 13 are executed successively, and when the opening degree of the sliding door 33 is not greater than the certain first opening degree (No in S21), sliding forward of the second-row seat 4 is prohibited (S26). Accordingly, the ingress intention of the passenger who is supposed to sit on the third-row seat 5 can be predicted easily when the opening degree of the sliding door 33 is detected and the opening degree is greater than the certain first opening degree. In this case, the second-row seat 4 is moved forward automatically and the distance between the second-row seat 4 and the third-row seat 5 can be expanded.

Herein, the seat-door control unit 60 and the steps S21, S25 that are executed by this control unit 60 correspond to first-seat driving control means for moving the second-row seat 4 forward when the door opening detecting switch 37 detects opening degree of the sliding door 33 that is greater than the certain first opening degree. Herein, like the above-described embodiments, the door driving mechanism 35 and the opening instruction operating potions 40, 45, 50, 55 may be provided to operate the sliding door 33 electrically. In this case, although the large opening mode or the small opening mode is instructed by operating of the opening instruction operating potions 40, 45, 50, 55, the determination whether there exists ingress intention of the passenger to the third-row seat 5 or not is done based on the signal from the door opening detecting switch 37, like the above, not on the instructed mode.

Herein, regardless of the existence of the door driving mechanism 35, the embodiment of the present invention may be configured such that the sliding door 33 can not be opened beyond the first opening degree manually when the small opening mode is instructed by operating the opening instruction operating potions 40, 45, 50, 55, while the sliding door 33 can be opened manually up to the second opening degree that is greater than the first opening degree, when the large opening mode is instructed.

Alternative Embodiment 3

Figure 16:
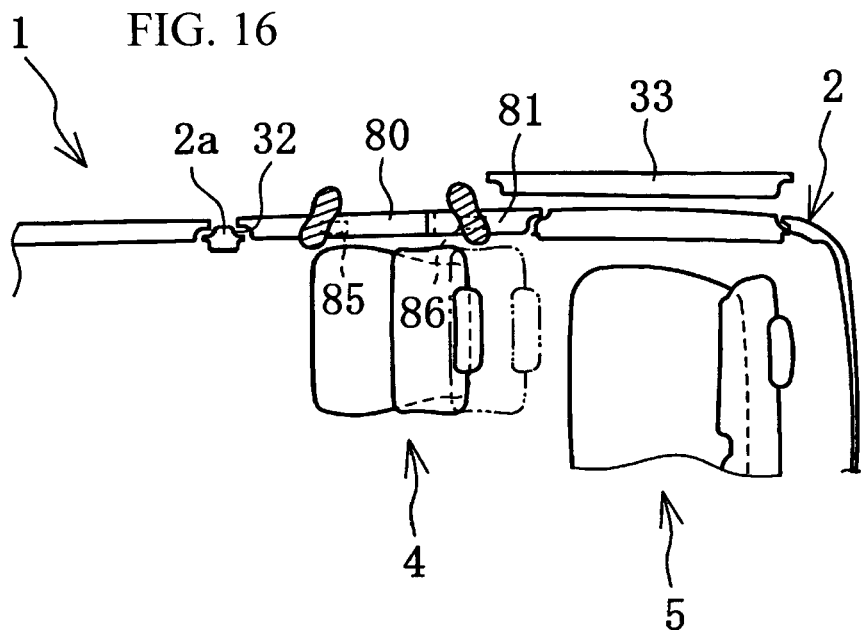
FIG. 16 is a horizontal sectional view of an essential part of a right-half part of an auto vehicle according to an alternative embodiment 3.

As shown in FIG. 16, the embodiment of the present invention may be configured such that a front step position detecting switch 85 is provided below a front scuff plate 80, which is a lower step located below the second-row ingress and egress opening 32, and a rear step position detecting switch 86 is provided below a rear scuff plate 81, which is a lower step located below the second-row ingress and egress opening 32, and a step position of the passenger is detected based on signals from the position detecting switches 85, 86. These step position detecting switches 85, 86 correspond to riding position detecting means for detecting ingress position of the passenger at the ingress and egress opening, and the ingress position detecting means is included by the above ingress position detecting means.

Figure 17:
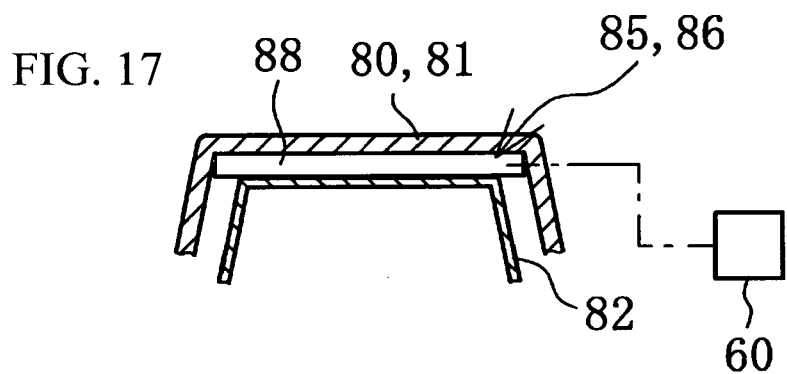
FIG. 17 is a partial sectional view of FIG. 16.
Figure 18:
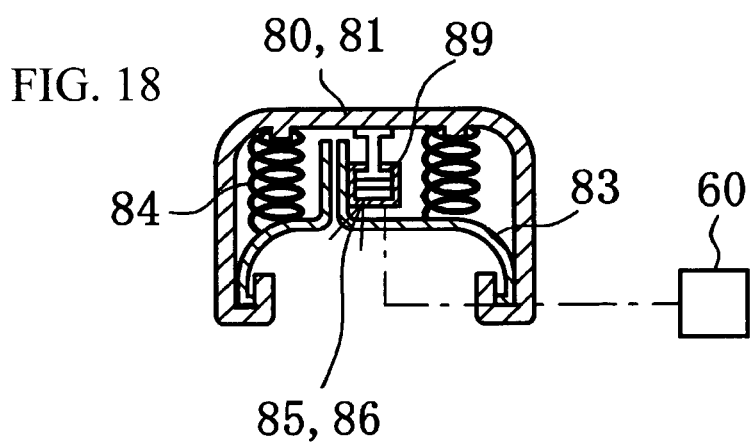
FIG. 18 is a sectional view of an alternative embodiment of FIG. 17.

A piezoelectric element 88 that is disposed between a step base 82 and the respective scuff plates 80, 81 so that both faces thereof can contact them may be used as the step position detecting switches 85, 86 as shown in FIG. 17, or a contact switch 89 that is disposed between a step base 83 and the scuff plates 80, 81, which are supported by the step base while being upwardly biased by a spring 84, may be used as the step position detecting switches 85, 86 as shown in FIG. 18. Herein, the piezoelectric element 88 and the contact switch 89 are connected to the seat-door control unit 60.

The front scuff plate 80 covers the frontal two-thirds of the lower step and the rear scuff plate 81 covers the rear one-third of the lower step. When the passenger steps on the rear scuff plate 81, it is predicted that there exists ingress intention of the passenger who is supposed to sit on the third-row seat 4. When the ingress intention is predicted, then the second-row seat 4 is driven forward and the distance between the second-row seat 4 and the third-row seat 5 expands.

Herein, in the alternative embodiment 3, the sliding door 33 may be configured so as to be operated automatically. In this case, the sliding door 33 may start opening motion automatically at the same time the passenger steps on the scuff plates 80 or 81, or when the power assist door switch 67 is pressed while the passenger steps on the scuff plate. When the passenger steps on the front scuff plate 80, the sliding door 33 may be opened partially, and when the passenger steps on the rear scuff plate 81, the sliding door 33 may be opened fully.

Further, in the alternative embodiment 3, the second-row seat 4 does not move forward automatically under a certain condition, even if ingress intention of the passenger who is supposed to sit on the third-row seat 5 is predicted, so that the distance between the second-row seat 4 and the third-row seat 5 does not expand. This certain condition is, like the above, at least one of that the passenger sits on the second-row seat 4; the passenger sits on the third-row seat 5; and the child seat 26 is installed on the second-row seat 4.

Alternative Embodiment 4

The embodiment of the present invention may be configured such that a driving mechanism for rotating the seat back 4*b* of the second-row seat 4 electrically is provided, and when ingress intention of the passenger who is supposed to sit on the third-row seat 5 is predicted, the seat back 4*b* is reclined forward by this mechanism, while the second-row seat 4 is being moved forward. This eases in having access to the third-row seat 5 through the second-row ingress and egress opening 32.

Alternative Embodiment 5

The embodiment of the present invention may be configured such that the front position at which the second-row seat 4 is moved forward, when ingress intention of the passenger who is supposed to sit on the third-row seat 5 is predicted and whose movement is limited, is changed appropriately according to the position in the longitudinal direction of the first-row seat 3 (for example, in the case where the first-row seat 3 is located at the rearmost position or the like).

Alternative Embodiment 6

The embodiment of the present invention may be configured such that when ingress intention of the passenger who is supposed to sit on the third-row seat 5 is predicted, the first-row seat 3 is driven forward to provide an enough space for the second-row seat 4 to move forward, and thereby the second-row seat 4 is driven forward as much as possible and the distance between the second-row seat 4 and the third-row seat 5 can expand as much as possible.

Alternative Embodiment 7

The embodiment of the present invention may be configured such that the third-row seat 5 is provided so as to move back and forth and a third-row seat driving mechanism is provided for driving the third-row seat 5 back and forth, and when ingress intention of the passenger who is supposed to sit on the third-row seat 5 is predicted, the second-row seat 4 is moved forward to expand the distance between the second-row seat 4 and the third-row seat 5, or the third-row seat 5 is moved backward without the forward motion of the second-row seat 4.

Alternative Embodiment 8

The embodiment of the present invention may be configured such that ingress intention of the passenger who is supposed to sit on the second-row seat 4 is predicted and when this ingress intention of the passenger is predicted, the first-row seat 3 is driven forward and/or the second-row seat 4 is driven backward so as to expand the distance between the first-row seat 3 and the second-row seat 4. In this case, the system for the access to the third-row seat in the above-described embodiment is applied to a system for the access to the second-row seat. This system is applicable to a vehicle that has no third-row seat.

Alternative Embodiment 9

Any other additional modifications may be applied within the scope of a spirit of the present invention, and the present invention can be applied to a van-type vehicle and like, other than the wagon-type vehicle like the above-described embodiment, that include a first seat (for example, second-row of seat) and a second seat (for example, third-row of seat), which are disposed in the longitudinal direction of the vehicle, and a seat driving mechanism to drive at least one of the first seat and the second seat back and forth.

Next, in addition to the function (when ingress intention of the passenger who is supposed to sit on the second seat (third-row seat) is predicted, the distance between the first seat (second-row seat) and the second seat (third-row seat) expands automatically), which above-described embodiments achieve, alternative embodiments of the present invention that have a preferable sliding door control function will be described. Namely, egress intention of the passenger who sits on a second seat (for example, the third-row seat), which is located behind a first seat (for example, the second-row seat), and when this egress intention of the passenger is predicted, the sliding door is opened automatically so that the passenger sitting on the second seat can get off through the ingress and egress opening. Accordingly, this provides a seat control device having a sliding door control function, in which taking time for egress of the passenger sitting on the second seat is avoided so as to shorten time for the egress, thereby providing an excellent operation.

It should be appreciated that these additional features may be adopted in combination with the function of the embodiments 1 to 9 by which the distance between the first seat and the second seat is expanded in accordance with the ingress intention of a passenger.

Hereafter, only modifications on the sliding door control will be described.

Alternative Embodiment 10

Figure 19:
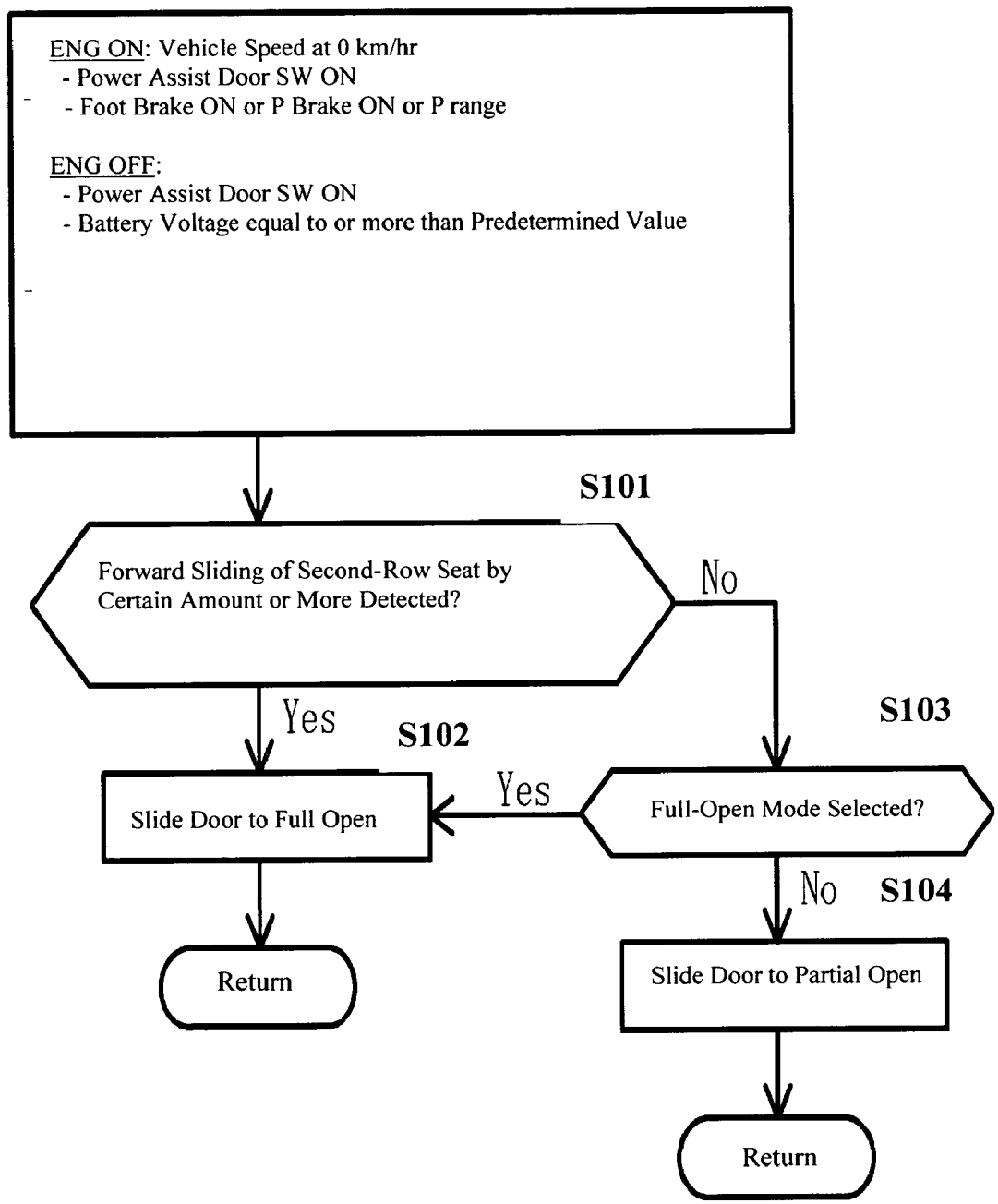
FIG. 19 is a flow chart for sliding door control according to an alternative embodiment 10.

As shown in FIG. 19, while the engine is ON, the control starts when the vehicle speed is at 0 km/h; the power assist door switch 67 is ON; and the foot brake 63 is ON or the parking brake 64 is ON or the sift lever 66 is at parking range. On the other hand, while the engine is OFF, the control starts when the power assist door switch 67 is ON and a voltage of the battery 61 is equal to or more than a predetermined value.

When this control starts, it is determined based on the signal from the second-row seat sliding detecting switch 17 whether forward sliding of the second-row seat 4 by a certain amount or more is detected (S101), and when the forward sliding of the second-row seat 4 by the certain amount or more is detected (Yes in S101), recognizing the egress intention of the passenger sitting on the third-row seat 5, the door driving mechanism 35 starts operating and the sliding door 33 is driven by the door driving mechanism 35 to open fully (S102), and then the sequence returns.

Meanwhile, when the second-row seat 4 has not slid forward by the certain amount or more (No in S101), it is determined based on the signal from the power assist door switch 67 whether full-open mode is selected or not (S103), and when the full-open mode is selected (Yes in S103), egress intention of the passenger sitting on the third-row seat 5 is recognized and the sequence proceeds to step S102. When partial-open mode is selected (Yes in S103), the door driving mechanism 35 starts operating, and the sliding door 33 is driven by the door driving mechanism 35 to open partially (S104), and the sequence returns.

As described above, in the present embodiment, when egress intention of the passenger sitting on the third-row seat 5 is predicted, the door driving mechanism 35 is further controlled by the seat-door control unit 60 to open the sliding door 33 so that the passenger sitting on the third-row seat 5 can get off through the second-row ingress and egress opening 32. Namely, when there exists egress intention of the passenger sitting on the third-row seat 5, the sliding door opens automatically to provide a state in which the passenger can easily get off through the second-row ingress and egress opening 32. Accordingly, taking time for the passenger sitting on the third-row seat 5 to get off is avoided so as to shorten time for the egress, thereby providing an excellent operation.

Egress intention of the passenger sitting on the third-row seat 5 can be predicted easily by detecting a walk-out state of the second-row seat in which the passenger sitting on the third-row seat 5 can get off through the second-row ingress and egress opening 32, and at this time the seat-door control unit 60 causes the door driving mechanism 35 to start its operation and the sliding door 33 is thus opened.

In the present embodiment, the walk-out state of the second-row seat 4 is defined as a state in which the second-row seat 4 has slid forward by a certain amount or more, and the seat sliding detecting switch 17 for detecting forward sliding of the second-row seat 4 by the certain amount or more is provided. Accordingly, the walk-out state of the second-row seat 4 can be detected easily by sliding the first seat forward by the certain amount or more.

The door driving mechanism 35 is configured so as to be selectable between the full-open mode and the partial-open mode, and the sliding door 33 can be driven to open at the greatest opening degree by the door driving mechanism 35 at the full-open mode, while the sliding door 33 can be driven to open at an opening degree that is smaller than the greatest opening degree by the driving mechanism 35 at the partial-open mode. When egress intention of the passenger sitting on the third-row seat 5 is predicted, the door driving mechanism 35 is set at the full-open mode by the seat-door control unit 60, even during the partial-open mode, and the sliding door 33 can be driven to open at the greatest opening degree.

This sliding door control is done when the sliding door 33 changes from its closing state to its opening state, and it can also be done when the sliding door 33 is at its opening state. For example, when the sliding door 33 has partially opened and the second-row seat 4 has slid forward by the certain amount or more, and herein when egress intention of the passenger sitting on the third-row seat 5 is predicted, the sliding door 33 opens automatically.

The opening degree of the sliding door 3 at the partial-open mode is sufficient for the passenger sitting on the second-row seat 4 to get off through the second-row ingress and egress opening 32. Accordingly, especially when the sliding door 33 is opened from its closing state, the sliding door 33 does not open unnecessarily wider, thereby reducing a load for its opening motion. Also, the opening degree of the sliding door 33 at the full-open mode is sufficient for the passenger sitting on the third-row seat 5 to also get off through the second-row ingress and egress opening 32. Accordingly, the passenger sitting on the third-row seat 5 can get off easily through the second-row ingress and egress opening 32.

An ABS computer 62 is provided as driving state detecting means for detecting a driving state of the vehicle, and when the driving state of the vehicle is detected by the ABS computer 62, the seat-door control unit 60 does not start the control of FIG. 19. Accordingly, even if egress intention of the passenger sitting on the third-row seat 5 is predicted, driving of the sliding door driving mechanism 35 is prohibited, thereby improving safety.

Next, alternative embodiments in which the sliding door control in the above-described embodiments is partially changed will be described.

Alternative Embodiment 11

Figure 20A:
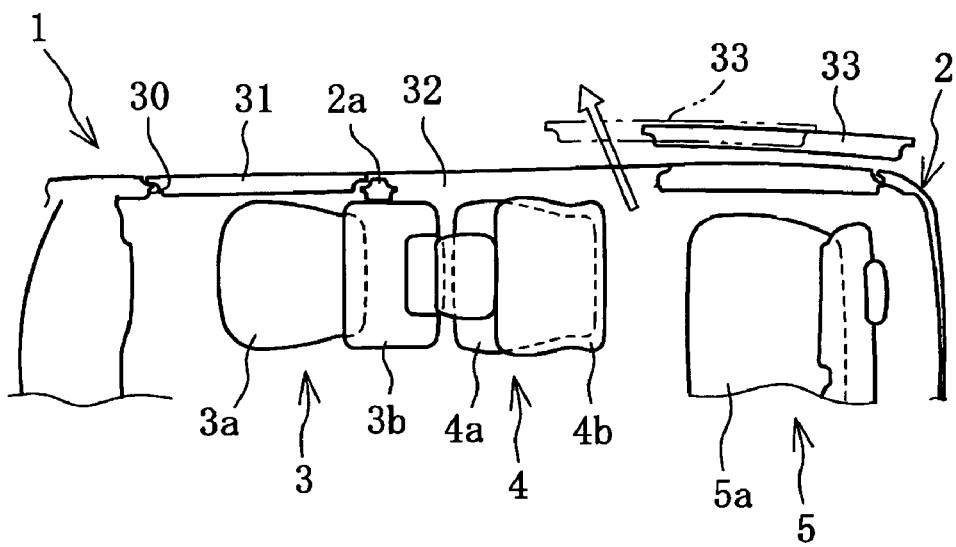
FIG. 20A, B are views of a state where the sliding door is fully opened without prediction of egress intention according to an alternative embodiment 11.
Figure 20B:
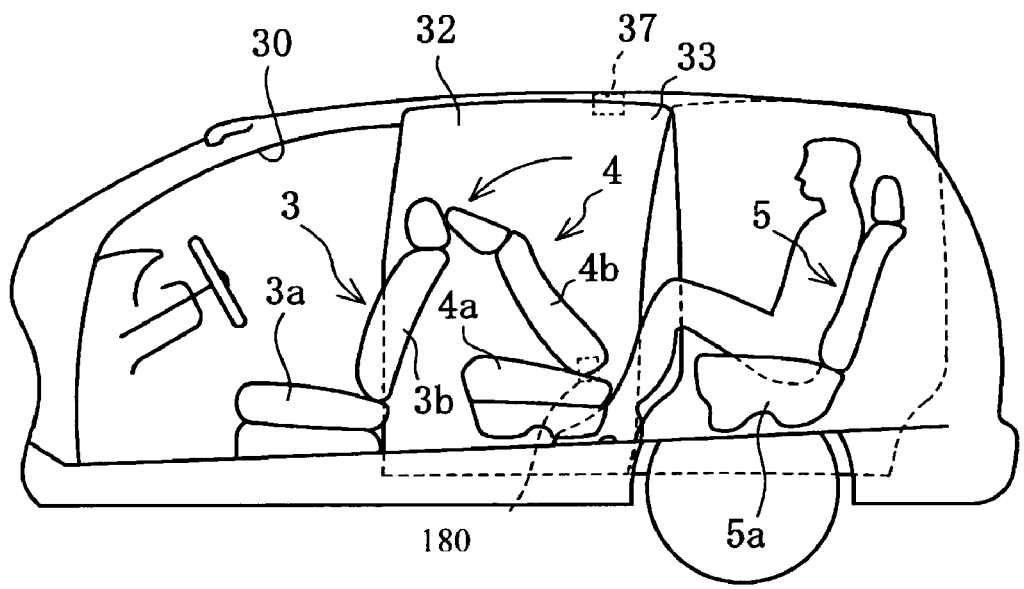
Figure 21:
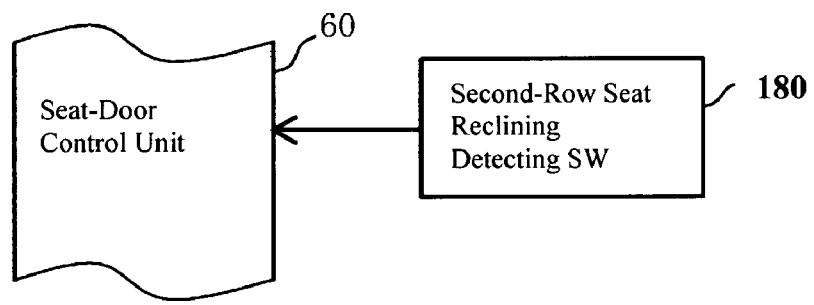
FIG. 21 is a block diagram of an essential part of a control system according to the alternative embodiment 11.

As shown in FIGS. 20 and 21, the embodiment of the present invention may be configured such that the walk-out state of the second-row seat 4 is defined as a state in which a seat back 4b of the second-row seat 4 has reclined forward by a certain amount or more, and the second-row seat reclining detecting switch 180 for detecting reclining forward of the seat back 4b by the certain amount or more is provided as walk-out detecting means for detecting the walk-out state of the second-row seat 4. Herein, the above certain amount is defined as the amount of reclining forward from a standard position of the seat back 4b (for example, its reclining position that is used normally, shown in FIG. 3).

Figure 22:
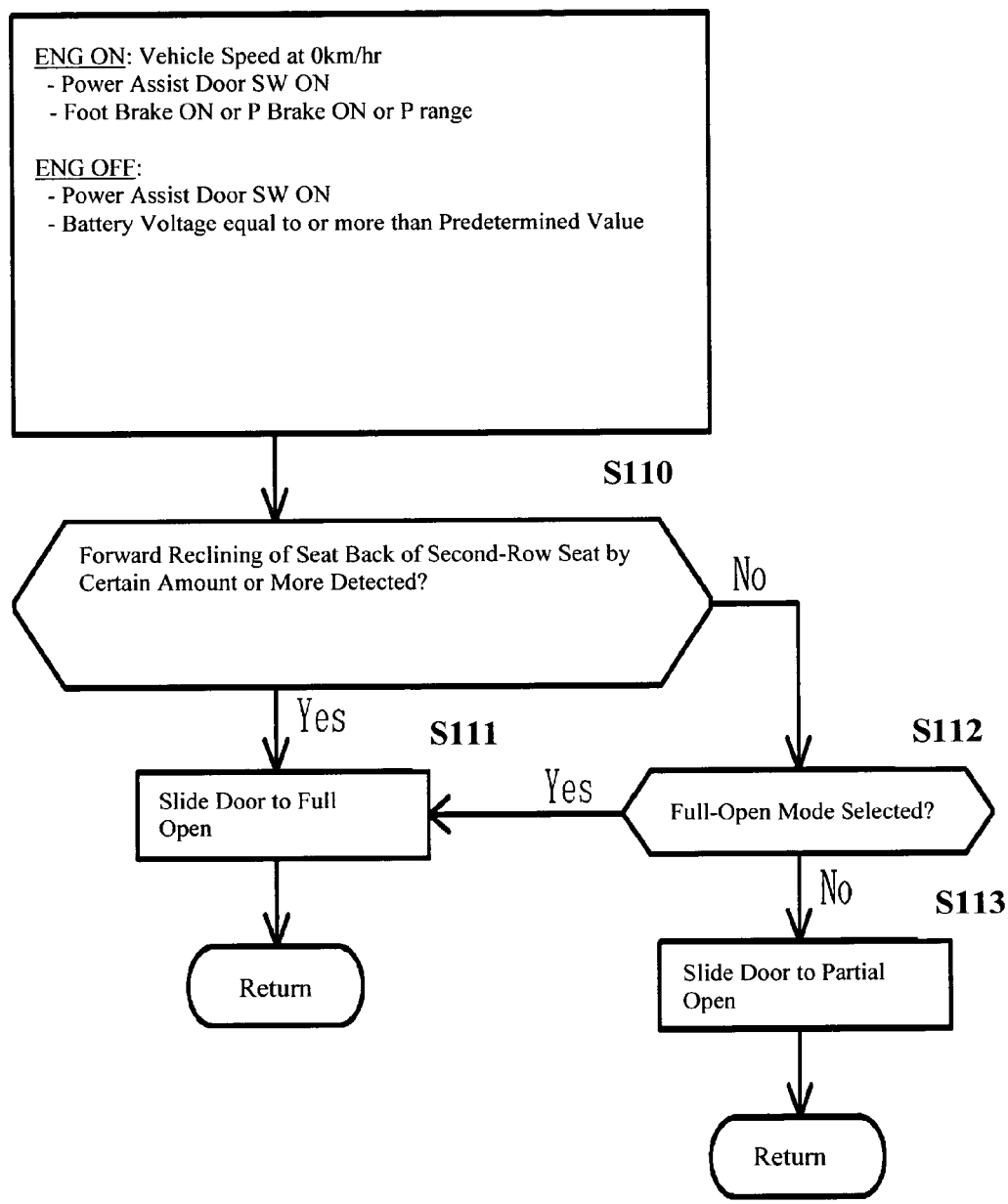
FIG. 22 is a flow chart for sliding door control according to the alternative embodiment 11.

The second-row seat reclining detecting switch 180 is electrically connected to the seat-door control unit 60. As shown in FIG. 22, the control executed by the seat-door control unit 60 starts under the same condition as FIG. 19, and when it starts, it is determined based on the signal from the second-row seat reclining detecting switch 180 whether forward reclining of the seat back 4b of the second-row seat 4 by the certain amount or more is detected (S110).

When forward reclining of the seat back 4b of the second-row seat 4 by the certain amount or more is detected (Yes in S110), the door driving mechanism 35 is controlled to start its operation, and the sliding door 33 is driven by the door driving mechanism 35 to open fully (S111), and the sequence returns. Meanwhile, in the event that the second-row seat 4 has not slid forward by the certain amount or more (No in S110), when the full-open mode is selected (Yes in S112), the sequence proceeds to step S111. When the partial-mode is selected (No in S112), the door driving mechanism 35 is controlled to start its operation, and the sliding door 33 is driven by the door driving mechanism 35 to open partially (S113), and the sequence returns.

Alternative Embodiment 12

Figure 23A:
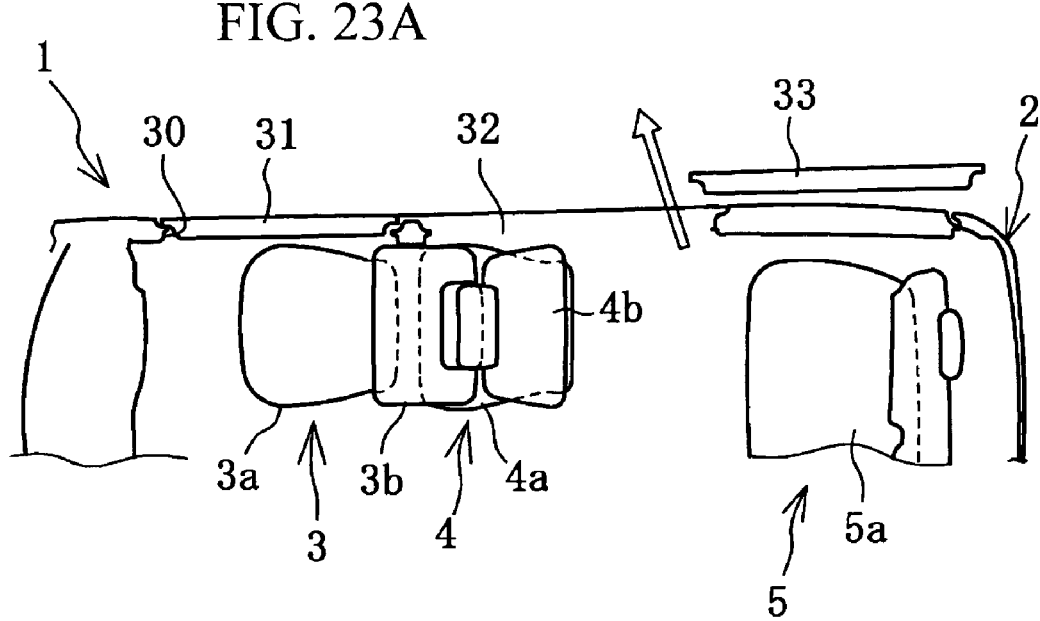
FIG. 23A, B are views of a state where the sliding door is fully opened without prediction of egress intention according to an alternative embodiment 12.
Figure 23B:
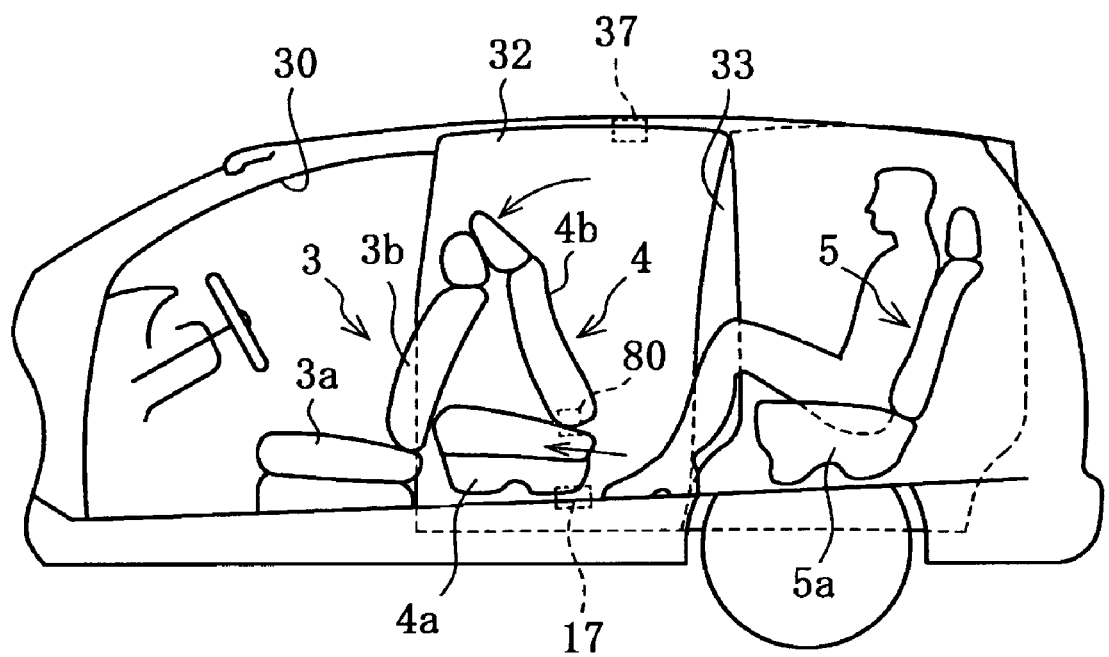

As shown in FIG. 23, the embodiment of the present invention may be configured such that the walk-out state of the second-row seat 4 is defined as a state in which the second-row seat 4 has slid forward by a certain amount or more and its seat back 4b has reclined forward by a certain amount or more, and the second-row seat sliding detecting switch 17 and the second-row seat reclining detecting switch 180 are provided as walk-out detecting means for detecting the walk-out state of the second-row seat 4.

Figure 24:
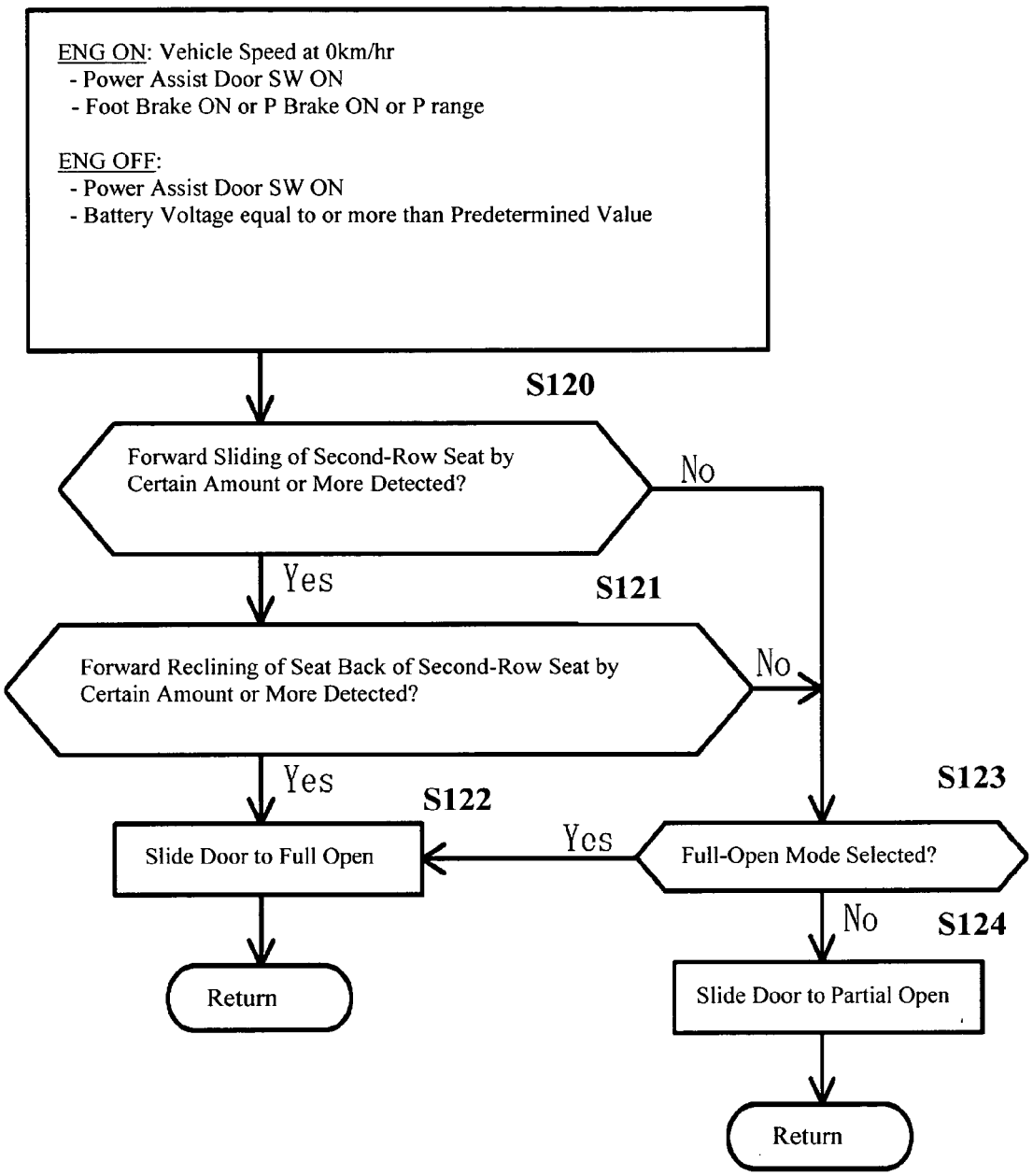
FIG. 24 is a flow chart for sliding door control according to the alternative embodiment 12.

As shown in FIG. 24, the control executed by the seat-door control unit 60 starts under the same condition of FIG. 19. After this control starts, when forward sliding of the second-row seat 4 by the certain amount or more is detected (Yes in S120), subsequently it is determined whether forward reclining of the seat back 4b of the second-row seat 4 by the certain amount or more is detected (S121). When forward reclining of the seat back 4b of the second-row seat 4 by the certain amount or more is detected (Yes in S121), the door driving mechanism 35 is controlled to start its operation, and the sliding door 33 is driven by the door driving mechanism 35 to open fully (S122), and the sequence returns.

Meanwhile, when forward sliding of the second-row seat 4 by the certain amount or more is not detected (No in S120), and when forward reclining of the seat back 4b of the second-row seat 4 by the certain amount or more is not detected (No in S121), the sequence proceeds to step S123. When the full-open mode is selected (Yes in S123), the sequence proceeds to step S122, and when the partial-open mode is selected (No in S123), the door driving mechanism 35 is controlled to start its operation, and the sliding door 33 is driven by the door driving mechanism 35 to open partially (S124), and the sequence returns.

Alternative Embodiment 13

Figure 25A:
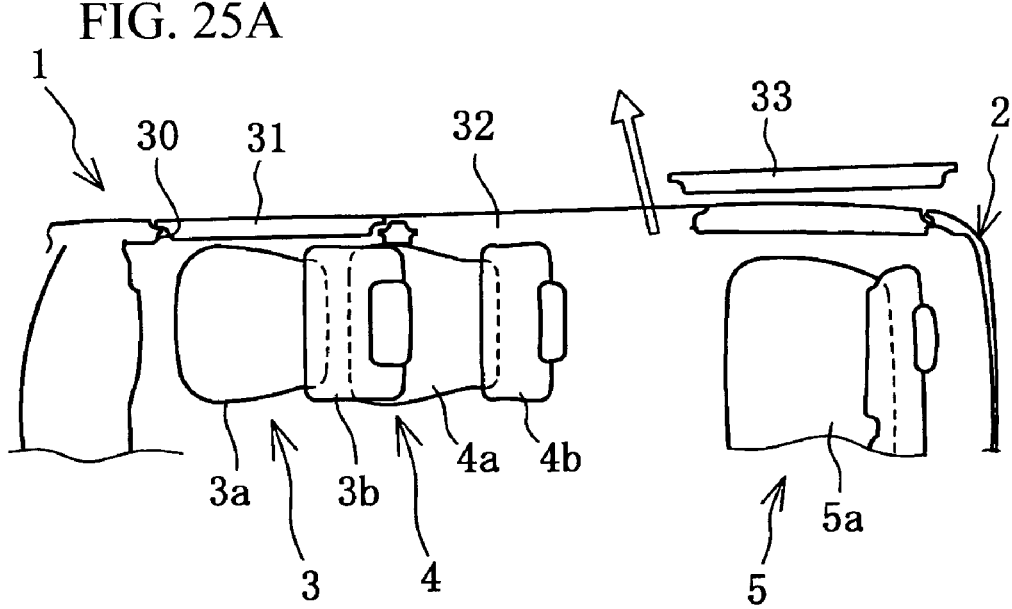
FIG. 25A, B are views of a state where the sliding door is fully opened without prediction of egress intention according to an alternative embodiment 13.
Figure 25B:
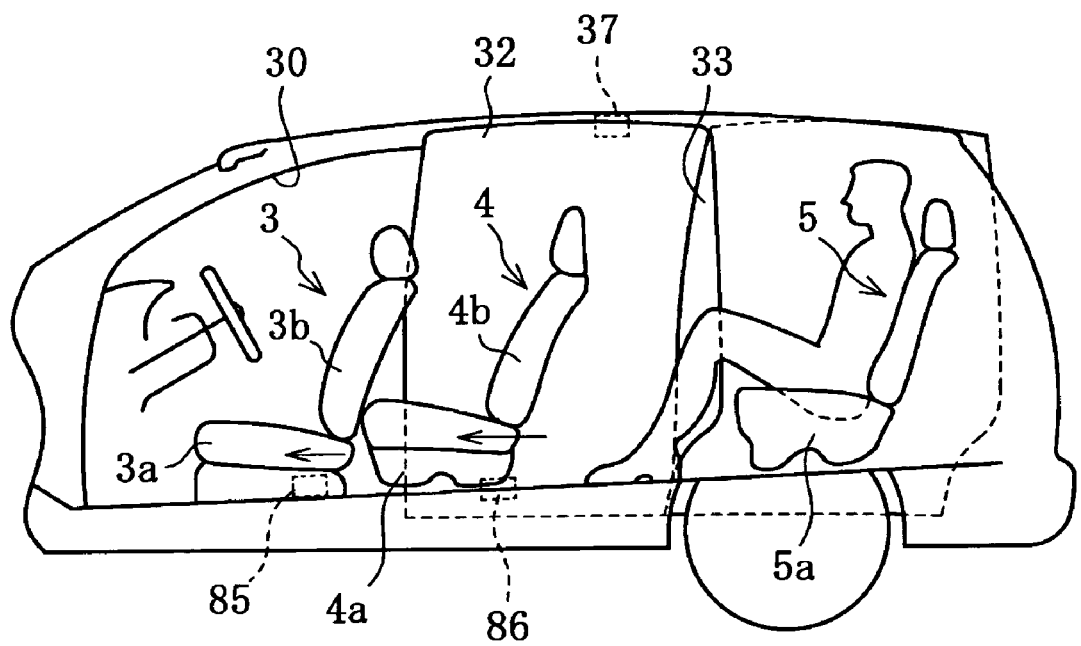
Figure 26:
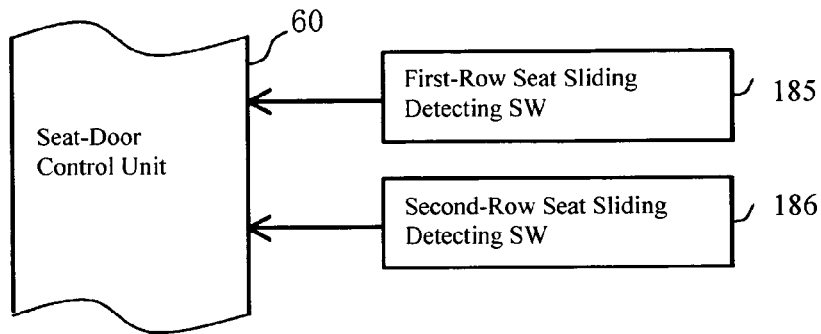
FIG. 26 is a block diagram of an essential part of a control system according to the alternative embodiment 13.

As shown in FIGS. 25 and 26, the embodiment of the present invention may be configured such that the walk-out state of the seat is defined as a state in which the total sliding amount Z obtained as the sum of a sliding amount X, which is the amount of forward sliding of the first-row seat 3, and a sliding amount Y, which is the amount of forward sliding of the second-row seat 4, has reached a certain amount or more, and a first-row seat sliding sensor 185 operative to detect the amount of forward sliding of the first-row set 3 and a second-row seat sliding sensor 186 operative to detect the amount of forward sliding of the second-row set 4 are provided as walk-out detecting means for detecting the above walk-out state.

Figure 27:
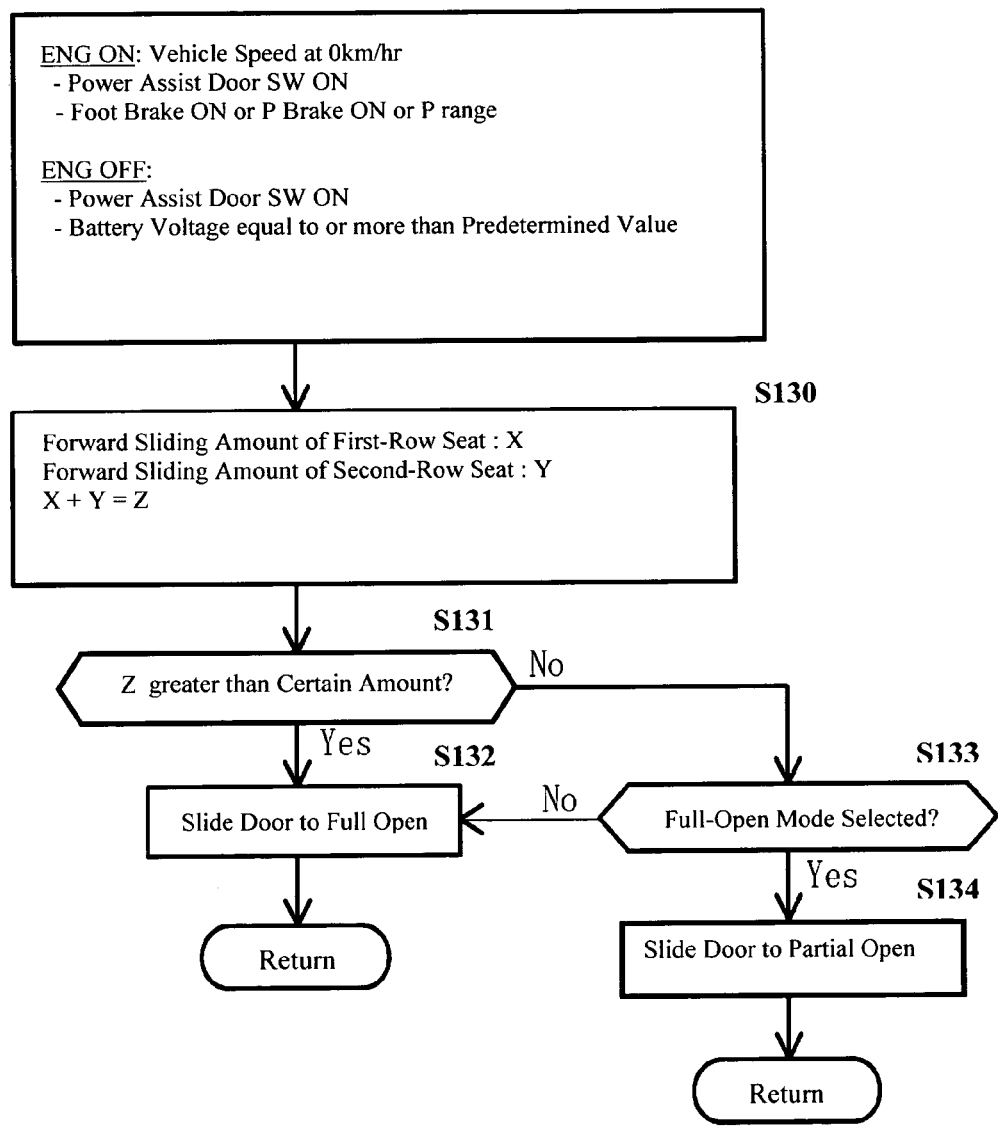
FIG. 27 is a flow chart for sliding door control according to the alternative embodiment 13.

As shown in FIG. 27, the control executed by the seat-door control unit 60 starts under the same condition of FIG. 19, and when this control starts, firstly the forward sliding amount X of the first-row seat 3 and the forward sliding amount Y of the second-row seat 4 are calculated based on the signals from the seat sliding sensors 185 and 186, and the total sliding amount Z is calculated by adding the sliding amounts X and Y (S130).

Next, it is determined whether the total sliding amount Z is the certain amount or more (S131), and when the total sliding amount Z is the certain amount or more (Yes in S131), the door driving mechanism 35 is controlled to start its operation, and the sliding door 33 is driven by the door driving mechanism 35 to open fully (S132), and the sequence returns. Meanwhile, when the total sliding amount Z is not the certain amount or more (No in S131), and when the full-open mode is selected (Yes in S133), the sequence proceeds to step S132. When the partial-open mode is selected (No in S133), the door driving mechanism 35 is controlled to start its operation, and the sliding door 33 is driven by the door driving mechanism 35 to open partially (S134), and the sequence returns.

Alternative Embodiment 14

Any other additional modifications may be applied within the scope of a spirit of the present invention, and the present invention can be applied to a van-type vehicle and like, other than the wagon-type vehicle like the above-described embodiment, that include a first-row seat and a second-row seat, which are disposed in the longitudinal direction of the vehicle, a sliding door that slides in the longitudinal direction to open and close an ingress and egress opening at the side of vehicle, and a door driving mechanism to drive the sliding door back and forth.

What is claimed is:

1. A seat control device for a vehicle including a first seat and a second seat that are disposed in a longitudinal direction of the vehicle, and a seat driving mechanism that drives at least one of the first and second seats such that the one moves in the longitudinal direction of the vehicle, comprising:
   second-seat ingress prediction means for predicting ingress intention of a passenger who is supposed to sit on the second seat; and
   seat driving control means that controls the seat driving mechanism such that a distance between the first seat and the second seat expands when said second-seat ingress prediction means predicts the ingress intention of the passenger who is supposed to sit on the second seat.

2. The seat control device for a vehicle of claim 1, wherein the vehicle includes a sliding door that slides in the longitudinal direction of the vehicle so as to open or close an ingress and egress opening located substantially at a side of the first seat, said second-seat ingress prediction means comprises door opening detecting means for detecting an opening degree of said sliding door, and said seat driving control means comprises first-seat driving control means that moves the first seat forward when said door opening detecting means detects an opening degree of the sliding door that is greater than a certain opening degree.

3. The seat control device for a vehicle of claim 1, wherein the vehicle includes a sliding door that slides in the longitudinal direction of the vehicle so as to open or close an ingress and egress opening located substantially at a side of the first seat and a door driving mechanism that drives said sliding door in the longitudinal direction of the vehicle, said second-seat ingress prediction means comprises opening instruction means that instructs at least either a small opening mode to open said sliding door at a first opening degree or a large opening mode to open said sliding door at a second opening degree that is greater than said first opening degree, and said seat driving control means comprises first-seat driving control means that moves the first seat forward when said opening instruction means instructs said large opening mode.

4. The seat control device for a vehicle of claim 3, wherein the opening degree of said sliding door is configured such that the passenger can have access to the first seat through said ingress and egress opening when the sliding door opens at said first opening degree, while the passenger can also have access to the second seat through said ingress and egress opening when the sliding door opens at said second opening degree.

5. The seat control device for a vehicle of claim 1, wherein said second-seat ingress prediction means comprises ingress position detecting means for detecting an ingress position of the passenger at an ingress and egress opening located substantially at a side of the first seat, and said seat driving control means comprises first-seat driving control means that moves the first seat forward when said ingress position detecting means detects that said ingress position of the passenger is located at a side of said second seat.

6. The seat control device for a vehicle of claim 5, wherein said ingress position detecting means comprises a step position detecting switch that is located at a step portion below said ingress and egress opening and to detect a step position of the passenger.

7. The seat control device for a vehicle of claim 1, wherein said seat driving control means prohibits the driving of said seat driving mechanism under a certain condition.

8. The seat control device for a vehicle of claim 7, wherein said certain condition is that the passenger sits on the first seat.

9. The seat control device for a vehicle of claim 7, wherein said certain condition is that the passenger sits on the second seat.

10. The seat control device for a vehicle of claim 7, wherein said certain condition is that a child seat is installed on the first seat.

11. The seat control device for a vehicle of claim 1, further comprising:
    a sliding door that slides in the longitudinal direction of the vehicle so as to open or close an ingress and egress opening at a side of the vehicle;
    a door driving mechanism that drives said sliding door in the longitudinal direction of the vehicle;
    egress prediction means for predicting egress intention of a passenger sitting on the second seat;
    sliding door driving control means that controls said door driving mechanism such that the passenger sitting on the second seat can get off through said ingress and egress opening with the sliding door opened when said egress prediction means predicts the egress intention of the passenger.

12. The seat control device for a vehicle of claim 11, wherein said ingress and egress opening is located substantially at a side of the first seat.

13. The seat control device for a vehicle of claim 12, wherein said egress prediction means comprises walk-out detecting means for detecting a walk-out state of the first seat in which the passenger sitting on the second seat can get off through said ingress and egress opening, and said sliding door driving control means starts driving of the door driving mechanism when said walk-out detecting means detects the walk-out state of the first seat.

14. The seat control device for a vehicle of claim 13, wherein said walk-out detecting means includes seat sliding detecting means for detecting the first seat sliding forward by a certain amount or more.

15. The seat control device for a vehicle of claim 13, wherein said walk-out detecting means includes reclining detecting means for detecting a seat back of the first seat reclining forward by a certain amount or more.

16. The seat control device for a vehicle of claim 11, wherein said door driving mechanism is configured such that the opening degree of the sliding door is selectable between a full-open mode where the sliding door is opened at the greatest opening degree and a partial-open mode where the sliding door is opened at an opening degree smaller than the greatest opening degree, and said sliding door driving control means selects said full-open mode when said egress prediction means predicts the egress intention of the passenger.

17. The seat control device for a vehicle of claim 16, wherein the opening degree of the sliding door at said partial-open mode allows the passenger sitting on the first seat to get off through said ingress and egress opening, while the opening degree of the sliding door at said full-open mode allows the passenger sitting on the second seat to also get off through said ingress and egress opening.

18. The seat control device for a vehicle of claim 11, including driving state detecting means for detecting a driving state of the vehicle, wherein said sliding door driving control means prohibits driving of said door driving mechanism when said driving state detecting means detects the driving state of the vehicle.

19. A seat control device for a vehicle comprising:
- a first-row seat including a driver's seat;
- a second-row seat disposed behind the first-row seat;
- a third-row seat disposed behind the second-row seat;
- a sliding door that slides in a longitudinal direction of the vehicle so as to open or close an ingress and egress opening located substantially at a side of said second-row seat;
- a seat driving mechanism that drives said second-row seat in the longitudinal direction of the vehicle;
- a door driving mechanism that drives said sliding door in the longitudinal direction of the vehicle, wherein said sliding door is configured so as to be opened at a certain first opening degree and a second opening degree that is greater than said first opening degree by said door driving mechanism; and
- a control unit that controls said seat driving mechanism and said door driving mechanism,
- wherein said control unit includes third-row seat ingress prediction section for predicting ingress intention of a passenger who is supposed to sit on said third-row seat, and seat driving control section that controls said seat driving mechanism such that a distance between said second-row seat and said third-row seat expands when said third-row seat ingress prediction section predicts the ingress intention of the passenger who is supposed to sit on said third-row seat,
- wherein said third-row seat ingress prediction section includes remote control operation section that instructs at least either a small opening mode to open said sliding door at said first opening degree or a large opening mode to open said sliding door at said second opening degree, and said seat driving control section drives said seat driving mechanism to move said second-row seat forward when said remote control operation section instructs said large opening mode.

20. The seat control device for a vehicle of claim 19, wherein said control unit further includes egress prediction section for predicting egress intention of a passenger sitting on said third-row seat, said sliding door is opened by said door driving mechanism such that the passenger sitting on the third-row seat can get off through said ingress and egress opening when said egress prediction section predicts the egress intention of the passenger, and said egress prediction section includes seat sliding detecting section for detecting said second-row seat sliding forward by a certain amount or more.

* * * * *